US006732217B1

(12) United States Patent
Nishikido

(10) Patent No.: US 6,732,217 B1
(45) Date of Patent: May 4, 2004

(54) CONTROL AND SUPERVISORY SIGNAL TRANSMISSION SYSTEM

(75) Inventor: Kenji Nishikido, Takatsuki (JP)

(73) Assignees: Harmo-Link Corporation, Osaka (JP); part interest; Anywire Corporation, Kyoto (JP); part interest ( * ) Notice: Subject to any disclaimer, the term of this patent is extended or adjusted under 35 U.S.C. 154(b) by 519 days.

(21) Appl. No.: 09/893,415

(22) Filed: Jun. 28, 2001

(30) Foreign Application Priority Data

Jun. 30, 2000 (JP) ....................................... 2000-199014
Mar. 9, 2001 (JP) ....................................... 2001-067034

(51) Int. Cl.[7] ................................................ G06F 1/00
(52) U.S. Cl. ........................ 710/306; 710/106; 710/110
(58) Field of Search ................................ 710/105–106, 710/110, 305, 306, 313, 58, 61; 707/208–209, 233

(56) References Cited

U.S. PATENT DOCUMENTS 3,870,828 A * 3/1975 Saliga ........................ 370/827
5,223,826 A * 6/1993 Amou et al. ................. 340/3.2
5,247,292 A * 9/1993 Nakanishi et al. ....... 340/10.34
5,566,343 A * 10/1996 Nishiguchi .................. 710/106
5,838,249 A * 11/1998 Saito et al. ................ 340/3.05
6,310,708 B1 * 10/2001 Ota et al. ................... 398/183

FOREIGN PATENT DOCUMENTS

JP 62-247245 9/1978
JP 62-229978 9/1987
JP 1-140826 6/1989

* cited by examiner

*Primary Examiner*—Paul R. Myers
*Assistant Examiner*—Raymond N Phan
(74) *Attorney, Agent, or Firm*—McGlew and Tuttle, P.C.

(57) ABSTRACT

A parent station output section changes a duty ratio between a period of a level other than a predetermined power-supply voltage level and a subsequent period of the power-supply voltage level according to each data value of a control data signal to convert the control data signal into a serial pulse voltage signal and output it onto a data signal line. A parent station input section detects a supervisory data signal superimposed on the serial pulse voltage signal transmitted over the data signal line as the presence or absence of a current signal generated by contention between the supervisory signal and the power-supply voltage on the rising edge of the power-supply voltage.

19 Claims, 24 Drawing Sheets

FIG. 12

| SUPERVISORY SIGNAL | 0 (TR4 OFF) | 1 (TR4 ON) |
|---|---|---|
| CHANGE CURRENT Iis ON RISING EDGE OF SUPPLY VOLTAGE | ip (CIRCUIT CURRENT IN CHILD STATION INPUT SECTION) | APPROX.100mA (LIMITED CURRENT (ON CURRENT) OF TR4 IN CHILD STATION INPUT SECTION) |
| CURRENT LOGIC WHEN 100 > is > ip | 0 | 1 |

CONTROL AND SUPERVISORY SIGNAL TRANSMISSION SYSTEM

BACKGROUND OF THE INVENTION

1. Field of the Invention

The present invention relates to a control and supervisory signal transmission system, and in particular, to a control and supervisory signal transmission system wherein a parallel control signal from a controller is converted into a serial signal to transmit it to a remote device, serial-parallel conversion is performed in a controlled section of the remote device to drive the device, a parallel supervisory signal in a sensor section to detect the status of the device is converted into a serial signal to transmit it to the controller, serial-parallel conversion is performed on the serial signal to provide it to the controller, the control signal is superimposed on a clock signal, and the supervisory signal is superimposed on these signals.

2. Description of the Related Art

In the technical field of automatic control, it is widely practiced that a control signal is sent from a controller such as a sequence controller, programmable controller, or computer to a number of remote controlled devices (a motor, solenoid, electromagnetic valve, relay, thyristor, and lamp, for example) to drive and control them and a supervisory signal is transmitted from a sensor section to the controller to detect the status of devices (the on/off state of a switch such as a reed switch, micro-switch, and push button switch)

In such a technology, a number of lines such as a power supply line, control signal line, and ground wire are used for the interconnection between the controller and the controlled devices, and between the controller and the sensor section. Therefore a problem has arisen that wiring work becomes difficult, wiring space decreases, and wiring costs increases as packaging density increases because of the recent downsizing of the controlled devices.

There are two approach to solving the problem: a "signal serial-parallel conversion system" (Japanese Patent Application No. 62-229978) and a "serial transmission system of a parallel sensor section signal" (Japanese Patent Application No. 62-247245). According to these systems, wiring in a transmission system between a controller and a controlled device or between the controller and a sensor section can be accomplished with a smaller number of lines because one (one bit) control signal (or sensor signal) corresponding to each clock can be superimposed on a clock signal line including power supply.

According an invention, a "control and supervisory signal transmission method" (Japanese Patent Application No. 1-140826), fast bidirectional signal transmission between a controller and a controlled unit and between the controller and a sensor section can be achieved by a simple configuration by connecting an input unit and an output unit to a parent station and providing a clock signal superimposed on power supply onto a common data signal line from the parent station. That is, the number of lines and the cost of wiring can be reduced, the connection arrangement of units can be simplified, and addresses can be allocated to the units at will, allowing the addition and deletion of a unit to be performed freely at a desired location.

According to the prior-art configuration describe above, fast bidirectional signal transmission between the controller and the controlled unit and between the controller and the sensor section can be achieved. However, a signal (hereinafter called a "control signal") from the controller to the controlled unit and a signal (hereinafter called a "supervisory signal") from the sensor section to the controller cannot be transmitted at the same time because they are provided onto the common data signal line. That is, the control signal and supervisory signal can be transmitted only mutually exclusively and cannot be transmitted in two directions at the same time. Therefore a time period during which the control signal is transmitted over the common data signal line and a time period during which the supervisory signal is transmitted must be separately provided.

SUMMARY OF THE INVENTION

It is an object of the present invention to provide a control and supervisory signal transmission system, wherein a control signal and supervisory signal are superimposed on a clock signal, the control signal is a binary signal having a predetermined duty ratio, and the supervisory signal as an electric current signal is detected.

It is another object of the present invention to provide a control and supervisory signal transmission system that superimposes a multiplexed control and supervisory signal on a clock signal.

It is still another object of the present invention to provide a control and supervisory signal transmission system that superimposes a first control signal which is a binary signal having a predetermined duty ratio and a second control signal which is a voltage signal on a clock signal and superimposes a supervisory signal which is a electric current signal on those signals.

It is still another object of the present invention to provide a control and supervisory signal transmission system that superimposes a first control signal which is a binary signal having a predetermined duty ratio and a second control signal which is a voltage signal on a clock signal and superimposes a first supervisory signal which is a current signal and a second supervisory signal which is a frequency signal on those signals.

A common configuration of a control and supervisory signal transmission system of the present invention comprises a controller; a plurality of controlled devices each of which includes a controlled section and a sensor section to monitor the controlled section; a parent station connected to the controller and a data signal line common to the plurality of controlled devices; and a plurality of child stations associated with the plurality of controlled devices and connected to the data signal line and the associated controlled devices, in which a control signal from the controller is transmitted to the controlled section and a supervisory signal from the sensor section is transmitted to the controller over the data signal line.

In addition to the components of the common configuration described above, the parent station of a control and supervisory signal transmission system of the present invention comprises timing generation means to generate a predetermined timing signal in synchronization with a clock having predetermined periodicity, a parent station output section, and a parent station input section. The parent station output section converts under the control of the timing signal the control signal into a serial pulse voltage signal by changing the duty ratio between a period of a voltage level other than a predetermined power-supply voltage level and the subsequent period of the power-supply voltage level in every period of the clock according to the data value of the control data signal input from the controller, and provides the converted signal onto the data signal line. The parent station input section detects under the control of the timing signal a supervisory data signal superimposed on a serial pulse voltage signal transmitted over the data signal line, in every period of the clock, as the presence or absence of a current signal generated by contention between the supervisory data signal and the power-supply voltage on the rising edge of the power-supply voltage level to extract each data value of the serial supervisory data signal, converts it into a supervisory signal and inputs it into the controller. Each of the plurality of child stations comprises a child station output section and a child station input section. The child station output section determines the duty ratio between a period of voltage level different from the power-supply voltage level of a serial pulse voltage signal and the subsequent period of the power-supply voltage level to extract the data values of a control data signal and provides data in the data values that corresponds to the child station to the corresponding controlled section. The child station input section constructs under the control of the timing signal the supervisory data signal constituted of a binary current level varying according to a value provided by the corresponding sensor section and superimposes it as the data value of the supervisory signal on a predetermined position of the serial pulse voltage signal.

According to the control and supervisory signal transmission system of the present invention, the control signal from the controller to the controlled section is made a binary signal (with the power-supply voltage level and another level) having a predetermined duty ratio and the supervisory signal from the sensor section to the controller is detected as the presence or absence of a current signal generated by contention between the binary signal and the power-supply voltage on the rising edge of the power-supply voltage level. This allows the control signal and supervisory signal to be superimposed on the clock signal. Therefore fast bidirectional signal transmission between the controller and the controlled section and between the controller and the sensor section can be achieved and the control signal and supervisory signal can be provided onto the common data signal line and transmitted bidirectionally at the same time. As a result, the need to provide separate periods for transmitting the control signal and the supervisory signal on the common data signal line can be eliminated, thus doubling the transfer rate of the signals.

In addition to the common components described above, the parent station of a control and supervisory signal transmission system of the present invention comprises timing generation means to generate a predetermined timing signal in synchronization with a clock having predetermined periodicity, a parent station output section, and a parent station input section. The parent station output section converts, under the control of the timing signal, first and second control data signals into serial pulse voltage signals by changing the duty ratio between a period of a voltage level other than a predetermined power-supply voltage level and the subsequent period of the power-supply voltage level in every period of the clock according to the data value of the first control data signal input from the controller and to change the level during the period of the level other than the power-supply voltage level at a predetermined level different form the power-supply voltage or a pseudo ground level according to the data value of a second control data signal input form the controller, and provides the converted signal onto the data signal line to provide the converted signals onto the data signal line. The parent station input section detects under the control of the timing signal a supervisory data signal superimposed on a serial pulse voltage signal transmitted over the data signal line, in every period of the clock, as the presence or absence of a current signal generated by contention between the supervisory data signal and the power-supply voltage on the rising edge of the power-supply voltage level to extract each data value of the serial supervisory data signal, converts it into a supervisory signal and inputs it into the controller. Each of the plurality of child stations comprises a child station output section and a child station input section. The child station output section, under the control of the timing signal, determines the duty ratio between a period of voltage level different from the power-supply voltage level of a serial pulse voltage signal and the subsequent period of the power-supply voltage level to extract the data values of a fist control data signal or determines whether or not the level during the period of the level other than the power-supply voltage is either a predetermined voltage level different form the power-supply voltage or the pseudo ground level to extract the data values of a second control data signal, and provides data in that data values that corresponds to the child station to the corresponding controlled section. The child station input section constructs under the control of the timing signal the supervisory data signal constituted of a binary current level according to a value provided by the corresponding sensor section and superimposes it as the data value of the supervisory signal on a predetermined position of the serial pulse voltage signal.

According to the control and supervisory signal transmission system of the present invention, the first control signal from the controller to the controlled section is made a binary signal (with the power-supply voltage level and another level) having a predetermined duty ratio, the level the second control signal other than the level of the power-supply voltage level of the first control signal is made the predetermined voltage level different from the power-supply voltage or the pseudo ground level, and the supervisory signal from the sensor section to the controller is detected as the presence or absence of a current signal generated by contention between the binary signal and the power-supply voltage on the rising edge of the power-supply level. This allows the first and second control signals and the supervisory signal to be superimposed on a clock signal. Therefore, fast and bidirectional signal transmission between the controller and controlled section and between the controller can be provided, as well as the sensor section and the multiplexed (duplexed) control signal and the (non-multiplexed) supervisory signal can be provided onto a common data signal line and the signals can be transmitted bidirectionally at a time. As a result, the need to provide separate period during which the control signal or the supervisory signal is transmitted on the common data signal line can be eliminated, achieving a signal transfer rate three times faster than a conventional signal transfer rate.

In addition to the components of the common configuration described above, a control and supervisory signal transmission system of the present invention further comprises timing generation means to generate a predetermined timing signal in synchronization with a clock having predetermined periodicity, a parent station output section, and a parent station input section. The parent station output section converts, under the control of the timing signal, first and second control signals into serial pulse voltage signals by changing the duty ratio between a period of a voltage level other than a predetermined power-supply voltage level and the subsequent period of the power-supply voltage level in every period of the clock according to the data value of the first control data signal input from the controller and to drive the level during the period of the level other than the power-supply voltage level to a predetermined level different form the power-supply voltage or a pseudo ground level according to the data value of a second control data signal input form the controller, and provides the converted signal onto the data signal line to provide the converted signals onto the data signal line. The parent station input section detects under the control of the timing signal a first supervisory data signal superimposed on a serial pulse voltage signal transmitted over the data signal line, in every period of the clock, as the presence or absence of a current signal generated by contention between the supervisory data signal and the power-supply voltage on the rising edge of the power-supply voltage level, detects a second supervisory data signal, which is a frequency signal superimposed on a serial pulse voltage signal transmitted over the data signal line, to extract data values of the first and second serial supervisory data signals, converts them into supervisory signals and inputs them into the controller. Each of the plurality of child stations comprises a child station output section and a child station input section. The child station output section, under the control of the timing signal, determines the duty ratio between a period of voltage level different from the power-supply voltage level of a serial pulse voltage signal and the subsequent period of the power-supply voltage level to extract the data values of a fist control data signal or determines whether or not the level during the period of the level other than the power-supply voltage is either a predetermined voltage level different form the power-supply voltage or the pseudo ground level to extract the data values of a second control data signal, and provides data in that data values that corresponds to the child station to the corresponding controlled section. The child station input section constructs under the control of the timing signal the first supervisory data signal constituted of a binary current level or the second supervisory data signal constituted of the frequency signal, according to a value provided by the corresponding sensor section superimposes it as the data value of the first or second supervisory signal on a predetermined position of the serial pulse voltage signal.

According to the control and supervisory signal transmission system of the present invention, the first control signal from the controller to the controlled section is made a binary signal (with the power-supply voltage level and another level) having a predetermined duty ratio, the level the second control signal other then the level of the power-supply voltage level of the first control signal is made the predetermined voltage level different from the power-supply voltage or the pseudo ground level, the first supervisory signal from the sensor section to the controller is detected as the presence or absence of a current signal generated by contention between the binary signal and the power-supply voltage on the rising edge of the power-supply level, and the second supervisory signal is provided as a signal having a frequency (and amplitude) different from other signals. This allows the first and second control signals and the first and second supervisory signals to be superimposed on a clock signal. Therefore, fast and bidirectional signal transmission between the controller and controlled section and between the controller and the sensor section can be provided, as well as the multiplexed (duplexed) control signal and the multiplexed (duplexed) supervisory signal can be provided onto a common data signal line and the signals can be transmitted bidirectionally at a time. That is, the control signal and the supervisory signal can be fully duplexed. As a result, the need to provide separate period during which the control signal or the supervisory signal is transmitted on the common data signal line can be eliminated, achieving a signal transfer rate four times faster than a conventional signal transfer rate.

In addition to the components of the common configuration described above, the parent station of a control and supervisory signal transmission system of the present invention further comprises timing generation means to generate a predetermined timing signal in synchronization with a clock having predetermined periodicity, a parent station output section, and a parent station input section. The parent station output section converts a control data signal into a serial pulse voltage signal by driving the first or latter half of the control data signal to a predetermine power-supply voltage level and to drive the latter or first half of the control data signal to a predetermined voltage level different from the power-supply voltage level or a pseudo ground level depending on each data value of the control data signal level input from the controller in every period of the clock under the control of the timing signal, and outputs the serial pulse voltage signal onto the data signal line. The parent station input section detects a frequency signal superimposed on the serial pulse voltage signal transmitted over the data signal line in every period of the clock under the control of the timing signal to extract each data value of the serial supervisory signal and converts the data value into the supervisory signal to input the supervisory signal into the controller. Each of the plurality of child stations comprises a child station output se and a child station input section. The child station output section determines whether or not the first or latter half of the serial pulse voltage signal is the predetermined voltage level different from the power-supply voltage level or the pseudo ground level in every period of the clock under the control of the timing signal to extract each data value of the control data signal and provides data corresponding to the child station in the data value to the controlled section. The child station input section forms a frequency signal according to a value in the corresponding sensor section under the timing of the timing signal and superimposes the frequency signal on a predetermined position of the serial pulse voltage signal as the data value of the supervisory signal.

According to the control and supervisory signal transmission system of the present invention, the control signal from the controller to the controlled section is made a signal with the power-supply voltage level and another level (the predetermined voltage level or the pseudo ground level) and the supervisory signal from the sensor section to the controller is made a signal having a frequency (and amplitude) different from other signals. This allows the control signal and supervisory signal to be superimposed on the clock signal. Therefore fast bidirectional signal transmission between the controller and the controlled section and between the controller and the sensor section can be achieved and the control signal and supervisory signal can be provided onto the common data signal line and transmitted bidirectionally at the same time. As a result, the need to provide separate periods for transmitting the control signal and the supervisory signal on the common data signal line can be eliminated, thus doubling the transfer rate of the signals.

In addition to the components of the common configuration described above, a control and supervisory signal transmission system of the present invention further comprises timing generation means to generate a predetermined timing signal in synchronization with a clock having predetermined periodicity, a parent station output section, and a parent station input section. The parent station output section changes the duty ratio between the period of a predetermined power-supply voltage level and a period of a pseudo ground level according to each value of a control data signal input from the controller in every period of the clock under the control of the timing signal to convert the control data signal into a serial pulse voltage signal and outputs the serial pulse voltage signal onto the data signal line. The parent station input section detects a frequency signal superimposed on the serial pulse voltage signal transmitted over the data signal line in every period of the clock under the control of the timing signal to extract each data value of the serial supervisory signal and converts the data value into the supervisory signal to input the supervisory signal into the controller. Each of the plurality of child stations comprises a child station output section and a child station input section. The child station output section determines the duty ratio between a period of the power-supply voltage level of the serial pulse voltage signal and a period of the pseudo ground level in every period of the clock under the control of the timing signal to extract each data value of the control data signal and outputs data corresponding to the child station in the data value to the corresponding controlled section. The child station input section forms a frequency signal according to a value in the corresponding sensor section under the timing of the timing signal and superimposes the frequency signal on a predetermined position of the serial pulse voltage signal as the data value of the supervisory signal.

According to the control and supervisory signal transmission system of the present invention, the control signal from the controller to the controlled section is made a binary signal (with the power-supply voltage level and another level) having a predetermined duty ratio and the supervisory signal from the sensor section to the controller is made a signal having a frequency (and amplitude) different from other signals. This allows the control signal and supervisory signal to be superimposed on the clock signal. Therefore fast bidirectional signal transmission between the controller and the controlled section and between the controller and the sensor section can be achieved and the control signal and supervisory signal can be provided onto the common data signal line and transmitted bidirectionally at the same time. As a result, the need to provide separate periods for transmitting the control signal and the supervisory signal on the common data signal line can be eliminated, thus doubling the transfer rate of the signals.

In addition to the components of the common configuration described above, a control and supervisory signal transmission system of the present invention further comprises timing generation means to generate a predetermined timing signal in synchronization with a clock having predetermined periodicity, and a parent station output section. The parent station output section changes the duty ratio between the period of a predetermined power-supply voltage level and a period of a pseudo or ground level according to each value of a control data signal input from the controller in every period of the clock under the control of the timing signal to convert the control data signal into a serial pulse voltage signal and outputs the serial pulse voltage signal onto the data signal line. The parent station outputs a start signal onto the data signal line before outputting the serial pulse voltage signal, the start signal having a voltage level equal to the power-supply voltage and a period longer than one period of the clock. The parent station counts clocks extracted from the serial pulse voltage signal to extract an address pre-assigned to the parent station and outputs an end signal. Each of the child stations comprises a child station output section determines the duty ratio between a period of the power-supply voltage level of the serial pulse voltage signal and a period of the pseudo or true ground level in every period of the clock under the control of the timing signal to extract each data value of the control data signal and outputs data corresponding to the child station in the data value to the corresponding controlled section. The child station output section outputs clocks extracted from the serial pulse voltage signal to extract an address pre-assigned to the child station output section and provides data at the address to the corresponding controlled section.

According to the control and supervisory signal transmission system of the present invention, the control signal from the controller to the controlled section is made a binary signal (with the power-supply voltage level and another level) having a predetermined duty ratio. This allows the control signal to be superimposed on the clock signal. As a result, the supervisory signal on the common data signal line can be transmitted with high reliability.

BRIEF DESCRIPTION OF THE DRAWINGS

FIGS. 6 and 7 show one example of a parent station, wherein FIG. 6 is a schematic diagram of the parent station and FIG. 7 is a waveform diagram of signals in the parent station shown in FIG. 6;

FIGS. 8 and 9 show one example of the child station output section, wherein FIG. 8 is schematic diagram of the child station output section and FIG. 9 is a waveform diagram of signals in the child station output station shown in FIG. 8;

FIGS. 10 and 11 show one example of a child station input section, wherein FIG. 10 is a schematic diagram of the child station input section and FIG. 11 is a waveform diagram of signals in the child station input section shown in FIG. 10;

FIG. 12 is a diagram for explaining the detection of a supervisory signal in the parent station;

FIGS. 14 and 15 show another example of a parent station, wherein FIG. 14 is a schematic diagram of the parent station and FIG. 15 is a waveform diagram of signals in the parent station shown in FIG. 14;

FIGS. 16 and 17 show another example of the child station output section, wherein FIG. 16 is schematic diagram of the child station output section and FIG. 17 is a waveform diagram of signals in the child station output station shown in FIG. 16;

FIGS. 19 and 20 show yet another example of a parent station, wherein FIG. 19 is a schematic diagram of the parent station and FIG. 20 is a waveform diagram of signals in the parent station shown in FIG. 19;

FIGS. 21 and 22 show yet another example of a child station input section, wherein FIG. 21 is a schematic diagram of the child station input section and FIG. 22 is a waveform diagram of signals in the child station input section shown in FIG. 21;

DESCRIPTION OF THE PREFERRED EMBODIMENTS

First Embodiment

Figure 1:
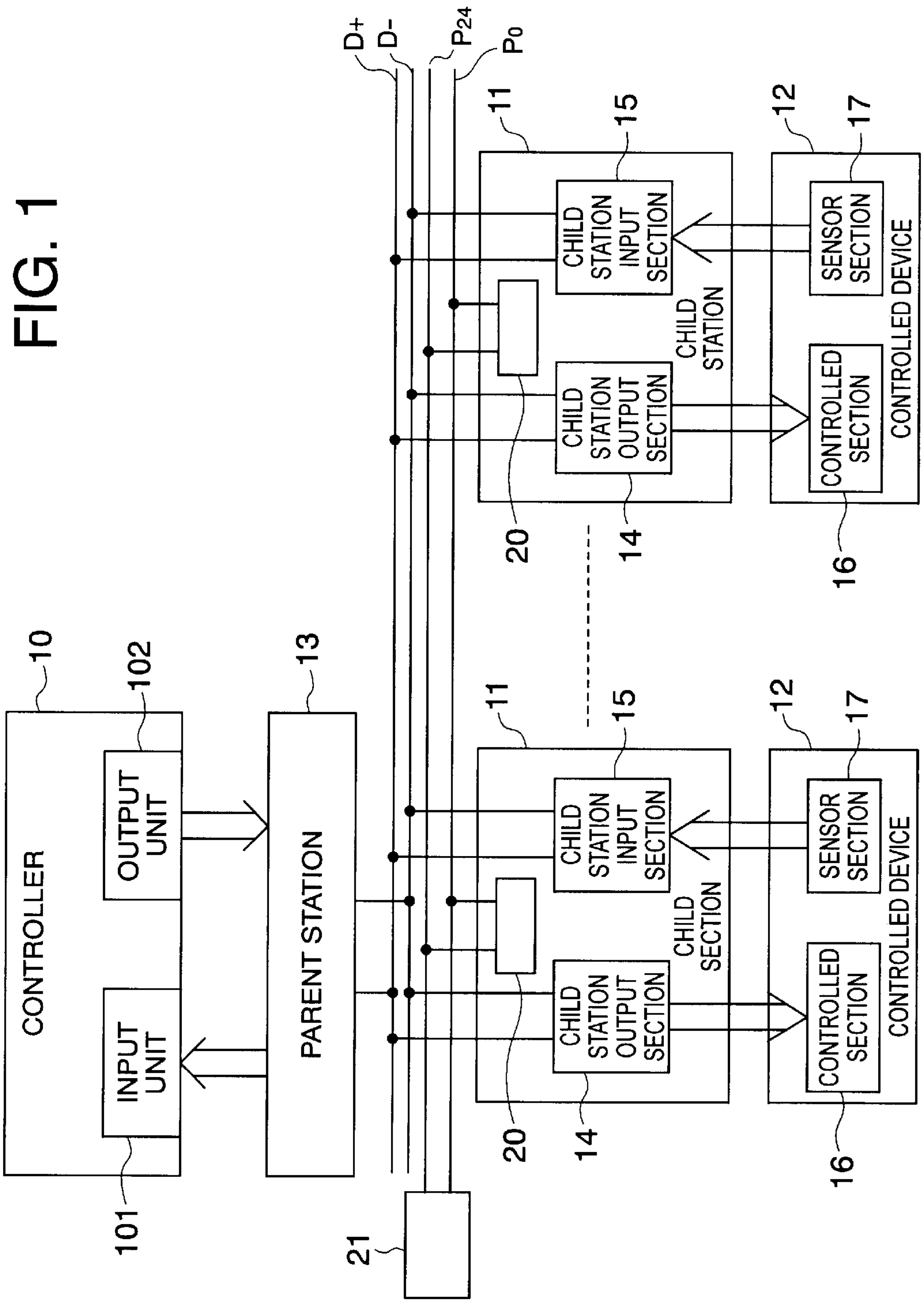
FIG. 1 is a block diagram of a basic configuration of the present invention.
Figure 2:
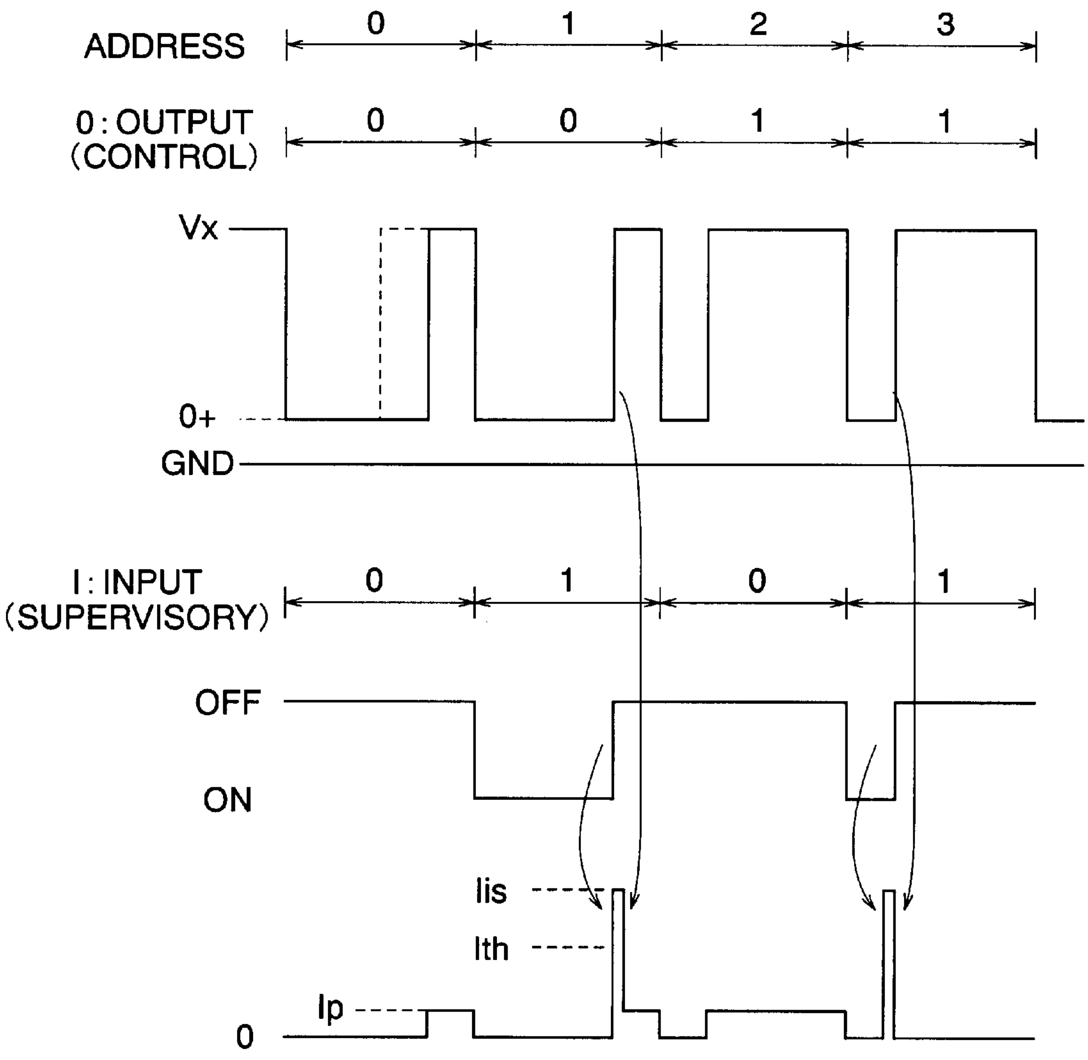
FIG. 2 is a diagram for illustrating signal transmission according to the present invention.
Figure 3:
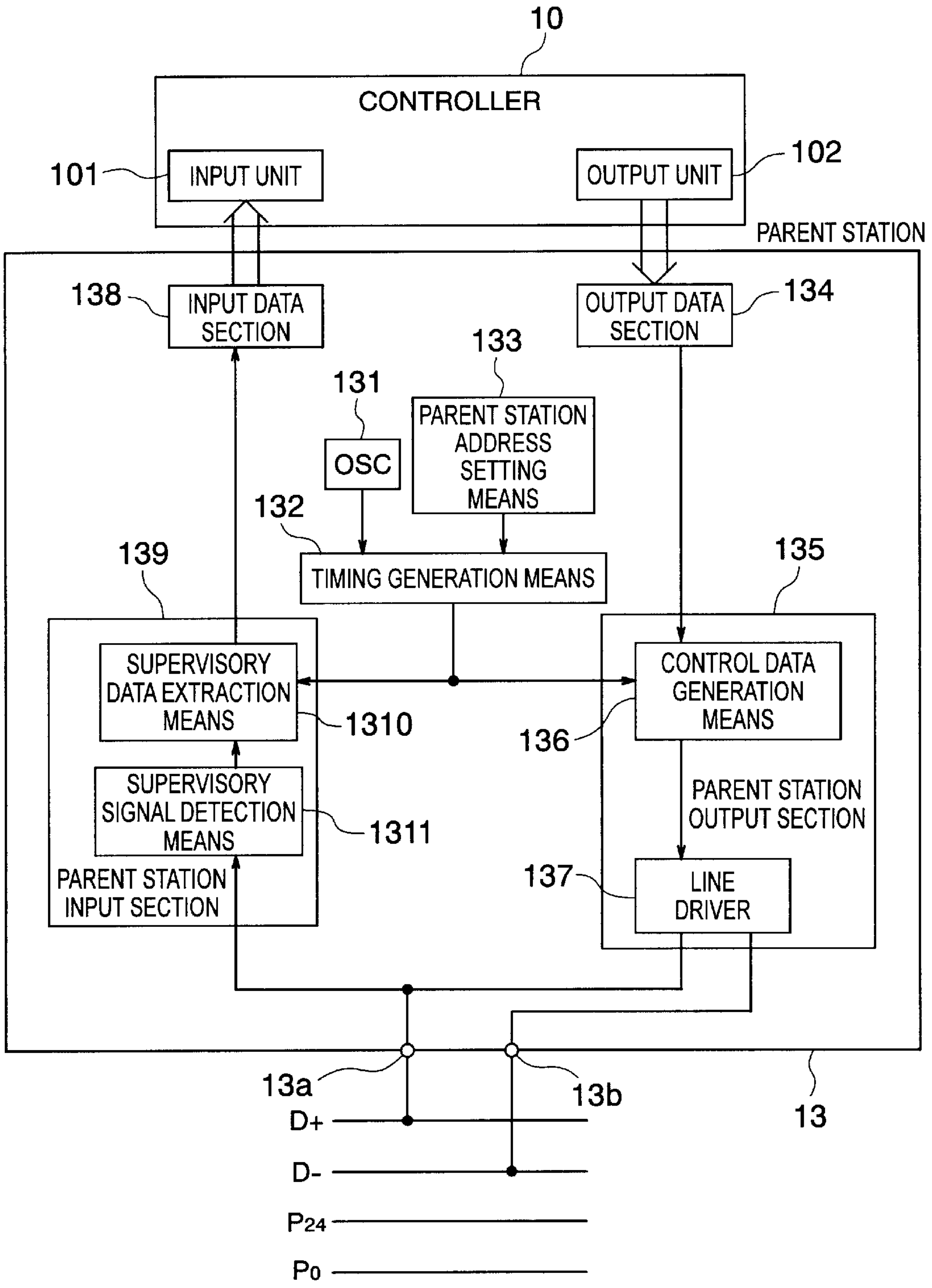
FIGS. 3 and 4 are block diagrams of basic configurations of the present invention.
Figure 4:
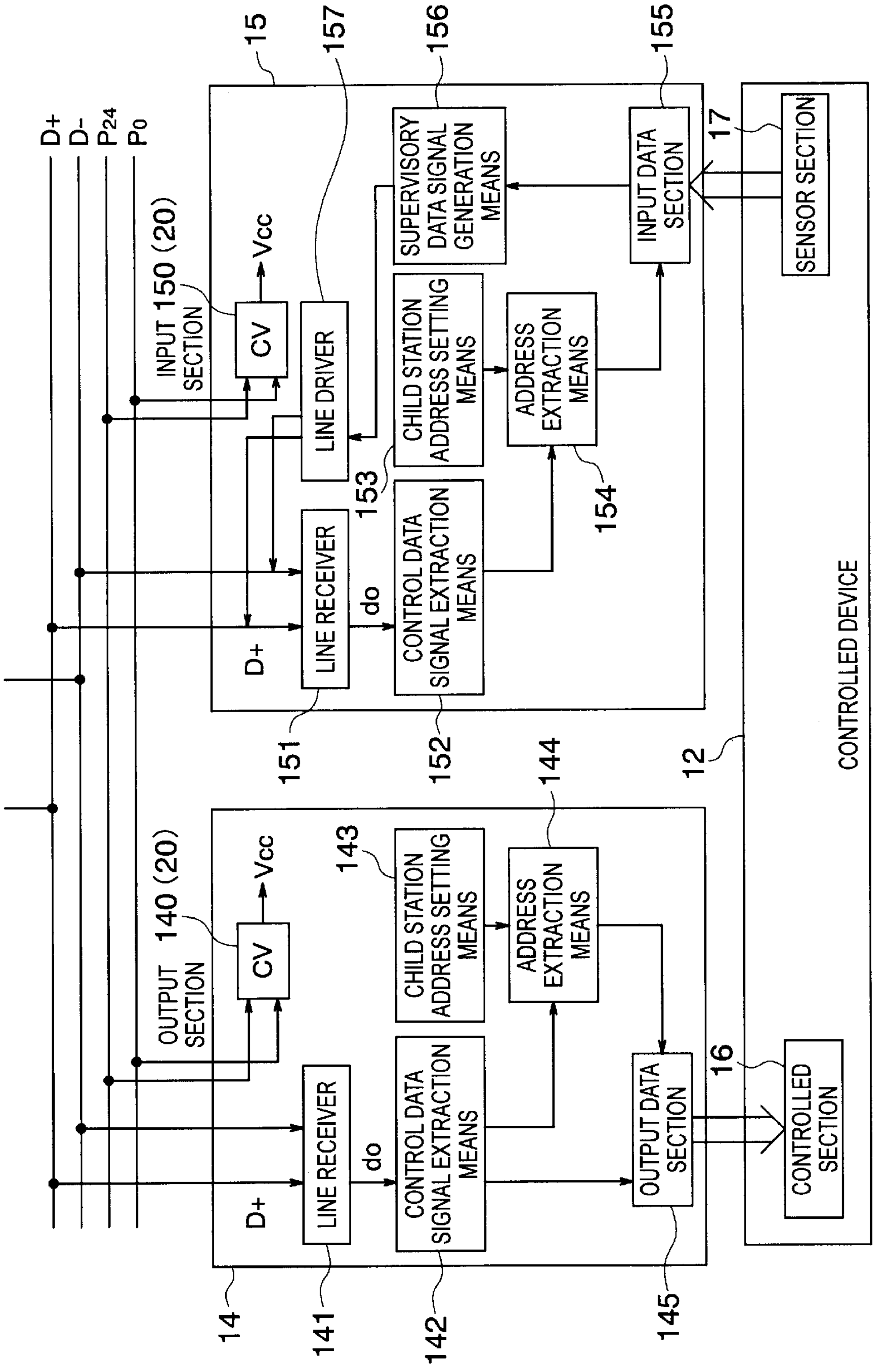

FIGS. 1, 3, and 4 are block diagrams of a basic configuration of the present invention and FIG. 2 is a diagram for explaining signal transmission according to the present invention. In particular, FIG. 1 shows a configuration of a control and supervisory signal transmission system, FIG. 3 shows a configuration of its parent station, and FIG. 4 shows a configuration of its child station.

The control and supervisory signal transmission system comprises a controller 10 and a plurality of controlled devices 12 each of which including a controlled section 16 and a sensor section 17 monitoring the controlled section 16, as shown in FIG. 1. The controller 10 may be a sequence controller, programmable controller, and computer, for example. The controlled section 16 and the sensor section 17 are collectively called a controlled device 12. The controlled section 16 consists of various components constituting the controlled device 12, such as an actuator, (stepping) motor, solenoid, electromagnetic valve, relay, thyristor, and lamp, for example. The sensor section 17 is chosen in accordance with the corresponding controlled section 16, may be a reed switch, micro-switch, and push button switch, for example, and outputs an on/off state (binary signal).

The control supervisory signal transmission system transmits a control signal from a output unit 102 in the controller 10 to the controlled section 16 over a data signal line common to the plurality of controlled units 12 and transmits a supervisory signal (sensor signal) from the sensor section 17 to an input unit 101 in the controller 10. As shown in FIG. 1, the control signal and supervisory signal output from and input into the controller 10 are parallel signals formed from a plurality of bits. On the other hand, the controlled signal and supervisory signal transmitted over the data signal line are serial signals. A parent station (main station) 13 performs parallel-serial conversion on the control signal and serial-parallel conversion on the supervisory signal. The data signal line consists of a first and second data signal lines, D+ and D−. The first signal line, D+, is used for supply of the power-supply voltage Vx, supply of the clock signal CK and the bidirectional transmission of the control signal and supervisory signal as will be described later. The second data signal line, D−, is at a ground level (for signals) common to the parent station 13 and a plurality of child stations 11.

In this example, a power line P to supply power-supply voltage Vx to (the child station power supply 20 of) each of the plurality of child stations 11 is provided. The power line P consists of first and second power lines $P_{24}$ and $P_0$. The first and second power lines $P_{24}$ and $P_0$ provide the power-supply voltage Vx (24 V) and the ground level (0 V) (for the power supply) common to the plurality of child stations, respectively, as will be described later. Therefore one end (or the both ends) of each of the first and second power lines $P_{24}$ and $P_0$ are connected to a local power supply 21. The configuration of the power line P may be a configuration described in Japanese Patent Application No. 1-140826, for example. The power capacity of the local power supply 21 can be changed depending on the number of the child stations 11 and allows each of the plurality of the child stations 11 to adequately operate. The local power supply 21 maybe provided within the parent station 13.

In order to transmit the signal as described above, the control and supervisory signal transmission system comprises the parent station 13 and the plurality of child stations 11 as shown in FIG. 1. The parent station 13 is connected to the controller 10 and data signal lines. The plurality of child stations 11 are associated with the plurality of controlled devices 12, connected to the data signal line at any positions, and connected to a the associated controlled devices 12. Each of the child stations 11 comprises a child station output section 14 and a child station input section 15. The child station output section 14 and the child station input section 15 are collectively called the child station 11. The child station output section 14 and child station input section 15 are associated with the controlled section 16 and the sensor section 17, respectively. The control signal and supervisory signal input into and output from the child station input section 15 and child station output section 14 are parallel signals formed from a plurality of bits. The child station output section 14 performs serial-parallel conversion on the control signal and the child station input section 15 performs parallel-serial conversion on the supervisory signal.

The parent station 13 comprises timing generation means 132, a parent station output section 135, and a parent station input section 139, as shown in FIG. 3. While only one parent station input section 139 and one parent station output section 135 are shown in FIG. 3, a plurality n of parent station input sections 139 (n≧1) may be provided and a plurality m of parent station output sections 135 (m≧1) maybe provided. M child station output sections 14 and n child station input sections 15 may be provided in association with them. .

The parent station 13 comprises an oscillator (OSC) 131, the timing generation means 132, and parent station address setting means 133. The timing generation means 132 generates a predetermined timing signal in synchronization with a clock CK having predetermined periodicity based on an oscillation output provided by the oscillator 131. That is, the timing generation means 132 superimposes power-supply voltage Vx on the generated clock CK. Therefore, the timing generation means 132 comprises power supply means (not shown) to generate power-supply voltage Vx at a predetermined level. For a example, the first half of the first period of clock CK at a duty ratio of 50% is kept at a pseudo ground level (0+) and the second half is kept at a level of power-supply voltage Vx, as indicated by a dashed line in FIG. 2. Clock CK including the power-supply voltage is in principle output to a terminal 13*a* and provided to the firs data signal line D+. On the other hand, the signal at the ground level (GND) is output from a terminal 13*b* to the second data signal line D−.

The clock CK including the power-supply voltage output form the timing generation means 132 is in practice input into the parent station output section 135. The parent station output section 135 comprises control data signal generation means 136 and a line driver 137. An output data section 134 holds a parallel control data signal input from the controller 10 and converts it into a serial data string to output it. The control data signal generation means 136 superimposes the each data value of the serial data string from the output data section 134 on the clock CK including the power-supply voltage. Despite the representation in FIG. 3, the output data section 134 may be considered as being included in the parent output section 135. The output from the control data signal generation means is provided onto the first data signal line D+ through the line driver 137, which is an output circuit.

As shown in FIG. 2, the parent output section 135 changes the duty ratio between a period of a level other than predetermined power-supply voltage Vx and the subsequent period of power-supply voltage according to each data value of the control data signal input from the controller 10 in every period of the clock CK under the control of the timing signal Vx to convert the control data signal into a serial pulse voltage signal and output it onto the data signal line. The voltage level other than the power-supply voltage Vx may be a pseudo ground level, 0+, for example, 0+=2 V, for example.

If the data value of the control data signal is "0", the parent station output section 135 in FIG. 2 changes the first ¾ period of the clock to the pseudo ground level, 0+, and the second ¼ period of the clock to the level of power-supply voltage Vx, for example. If the data value of the control data signal is "1", it changes the first ¼ period of the clock to the pseudo ground level, 0+, and the second ¾ period of the clock to the power-supply voltage Vx level. That is, the duty ratio of the clock is changed according to the data value of the control data signal. By this, the parallel control data signal is converted into a serial pulse voltage signal to output it onto the data signal line. For example, if the data value of the control data signal is "0011", the output from the control data signal generation means 136 would be as shown in FIG. 2 (an output from which a supervisory data signal which will be described later is excluded). An address is assigned to each period of the clock CK.

On the other hand, a signal on the first data signal line, D+, is taken into the parent station input section 139. The parent station input section 139 comprises supervisory signal detection means 1311 and supervisory data extraction means 1310. The supervisory signal detection means 1311 obtains the signal on the first data signal line D+ and detects a supervisory data signal superimposed on the signal to output it. The supervisory data extraction means 1310 brings the output of the detection into synchronization with a clock CK including the power-supply voltage from the timing generation means 132 to output it (by applying waveform shaping to it) An input data section 138 converts a serial data string formed from the detected supervisory data signals into parallel supervisory data signals to output them. Despite the representation in FIG. 3, the input data section 138 may be considered as being contained in the parent station input section 139.

As shown in FIG. 2, the parent station input section 139 detects in every clock period under the control of a timing signal a supervisory data signal superimposed on the serial pulse voltage signal transmitted over the data signal line as the presence or absence of a current signal, Iis, generated by contention between the supervisory data signal and power-supply voltage Vx on the rising edge of power-supply voltage Vx. By this, it extracts each data value of the serial supervisory signal and converts it into a supervisory signal to input it to the controller 10. Therefore, if the data value of the supervisory data signal is "0101", for example, the output (detected current) from the supervisory signal detection means 1311 would be as shown in FIG. 2.

Because the control signals to be distributed to the plurality of child stations 11 are transmitted as the serial signal (serial pulse voltage signal) from the single parent station 13 over the data signal line as described above, an address count method is used as the distribution means. That is, the total amount of data of the control data signal to be sent (distributed) to the child stations 11 can be known beforehand. Therefore one address is assigned to each pieces of data of all the control data signals. The child station 11 extracts clocks CK from the serial pulse voltage signal and counts the number of clocks CK, and, if it encounters (one or more) addresses assigned to control data signal data that it should receive, it obtains the data value of the serial pulse voltage signal at that time point as the control signal. An end address is assigned to the parent station 13 for creating an end signal.

In order to determine the start and end of the address counting, a start signal and end signal is created. Before outputting the serial pulse voltage signal, the timing generation means 132 of the parent station 13 creates a start signal to provide it onto the first data signal line, D+. The start signal is at the level of the power-supply voltage Vx and longer than one period of clock CK so as to be distinguished from a control signal. The parent station address setting means 133 holds an address assigned to the parent station 13. The parent station 13 counts clocks CK extracted from the serial pulse voltage signal to obtain the address preassigned to it and provides an end signal onto the first data signal line, D+ at that time point. The end signal is at a voltage of Vx/2 and longer than one period of clock CK and shorter than the start signal.

The child station output section 14 is comprises power-supply voltage generation means (CV) 140, a line receiver 141, control data signal extraction means 142, child station address setting means 143, address extraction means 144, and output data section 145 as shown in FIG. 4.

Figure 8:
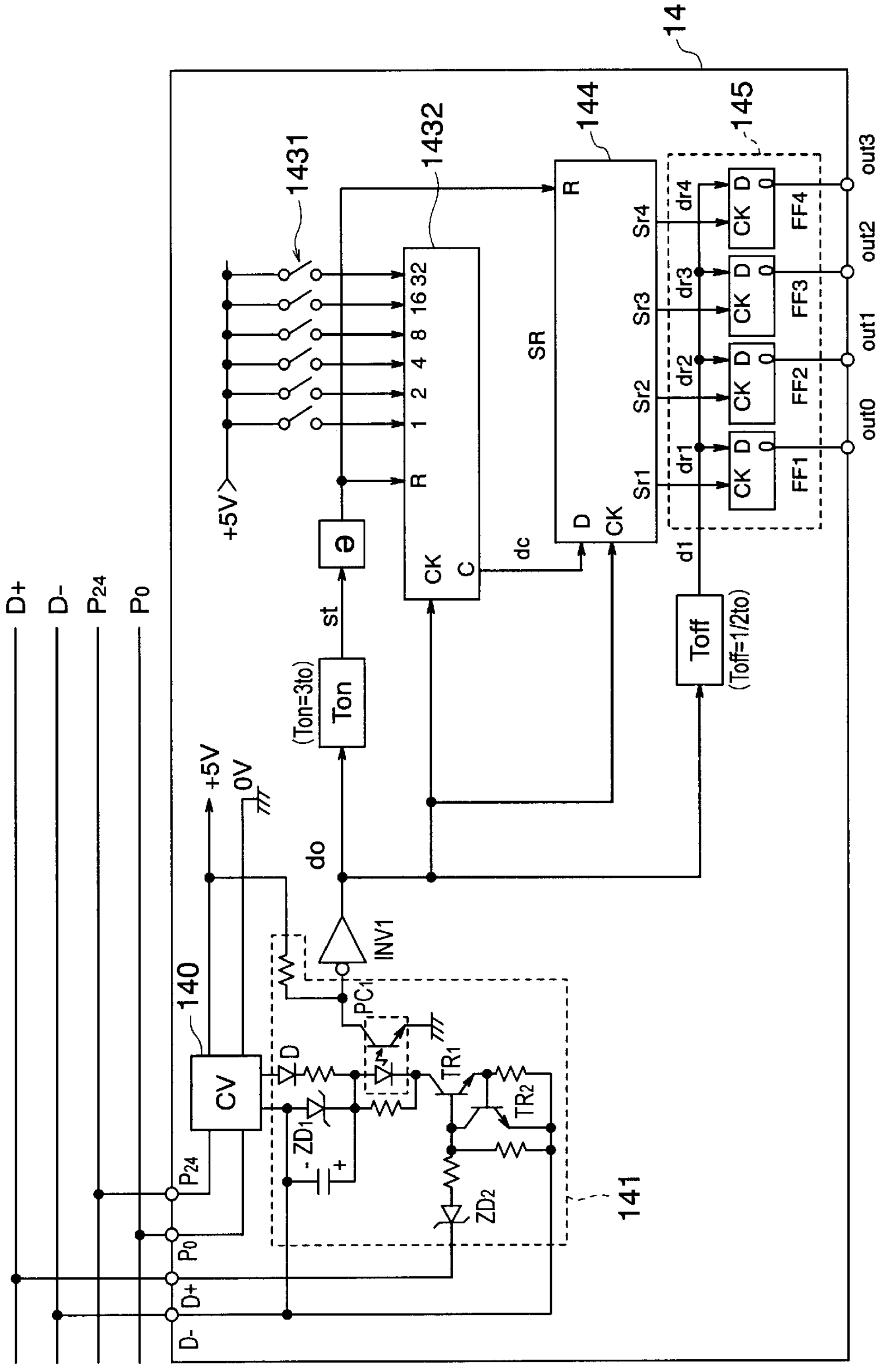
Figure 10:
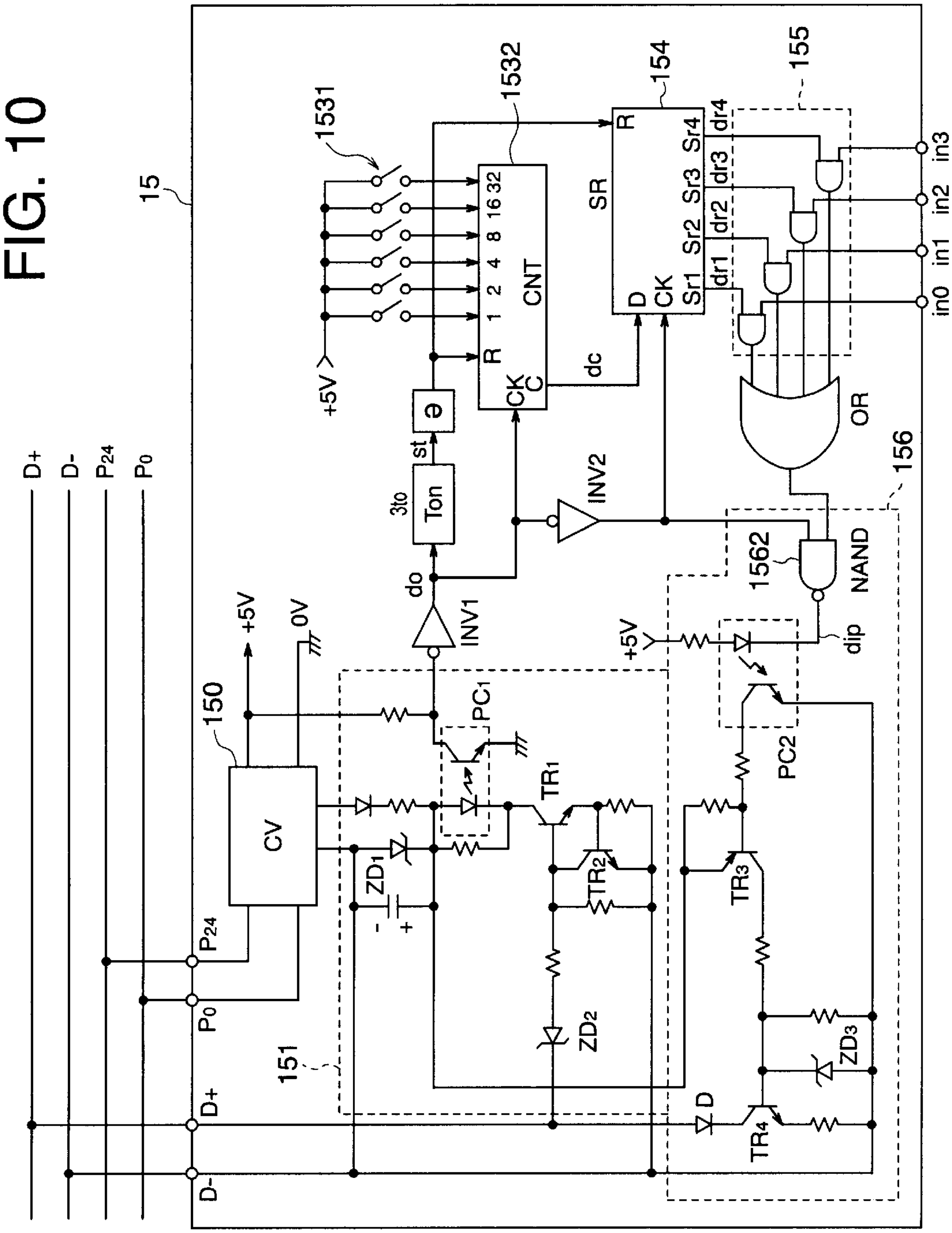

The power-supply voltage generation means 140 of the child station output section 14 and the power-supply voltage generation means (CV) 150 of the child station input section 15, which will be described later, constitute a child station power supply 20. The child station power supply 20 may be provided by integrating the power-supply voltage generation means 140 with the power-supply voltage generation means 150. The actual connections between the power-supply voltage generation means 140 and child station output section 14 and between the power-supply voltage generation means 150 and child station input section 15 are shown in FIGS. 8 and 10.

Figure 5:
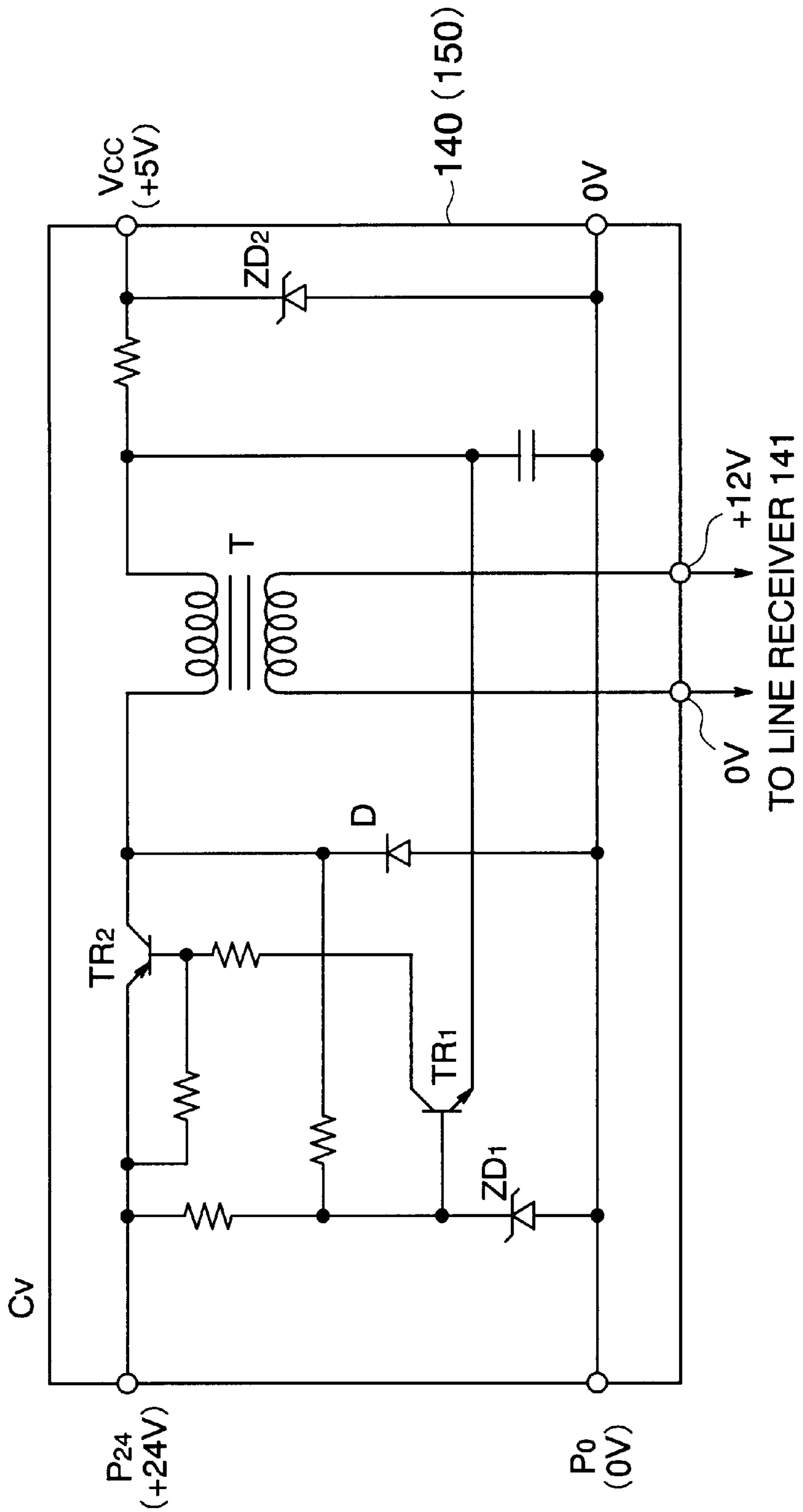
FIG. 5 is a schematic diagram of one example of a child station output section.

The power-supply voltage generation means (CV) 140 is a DC (direct current)—DC converter and generates a constant-level power-supply voltage, Vcc, from a power line for electrically driving circuits constituting the child station output section 14, as shown in FIG. 5. That is, stabilized power-supply voltage Vcc (5 V) and an output (12 V) to the line receiver 144 are obtained mainly by smoothing and stabilizing power-supply voltage Vx of the power line $P_{24}$ by well-known means shown in FIG. 5. The output to the line receiver 141 of the child station output section 14 is insulated by transformer T so as not to be affected by variations in power-supply voltage Vx. The power-supply voltage generation means 140 also generates power-supply voltage Vcc from the serial pulse voltage signal, for electrically driving the controlled section 16 in a corresponding controlled device 12. The power-supply voltage generation means 140 supplies power to the controlled section 16, which is not shown.

The power-supply voltage generation means 140 generates power-supply voltage Vcc from the serial pulse voltage signal for electrically driving low-power-consuming circuits (an LED indicator circuit, for example) associated with the child station output section 14, which are not shown. That is, stabilized power-supply voltage Vcc is obtained mainly by smoothing and stabilizing power-supply voltage Vx of the second half of the serial pulse voltage signal on the first data signal line, D+, by well-known means.

The line receiver 141, which is an input circuit, obtains a signal transmitted over the first data signal line, D+, and outputs it to the control data signal extraction means 142. The control data signal extraction means 142 extracts a control data signal from the signal and outputs it to the address extraction means 144 and the output data section 145. The child address setting means 143 holds its own address assigned to the child station output section 14. The address extraction means 144 extracts an address that matches the own station's address held by the child address setting means 143 and outputs it to the output data section 145. When the address is input to the output data section 145 from the address extraction means 144, the output data section 145 outputs one or more data values of a (serial) signal transmitted over the firs data signal line, D+, which are held by the output data section at that time point. That is, the output data section 145 performs serial-parallel conversion on the control signal.

As shown in FIG. 2, the child station output section 14 determines the duty ratio between the period of a level (the pseudo ground level, $0^{31}$ ) other than the level of power-supply voltage of the serial pulse voltage signal and the subsequent period of the level of power-supply voltage Vx in every period of clock CK under the control of a timing signal. Thus, data values in the control signal is extracted and data in the data values that corresponds to the child station is provided to the corresponding controlled section 16. For example, "0" is extracted as the data value of the original control data signal if the first ¾ period of the clock CK is at a pseudo ground level, 0+, or "1" is extracted as the data value of the original control data signal if the first ¼ period is at the pseudo ground level, 0+. Therefore, if the serial pulse voltage signal is as shown in FIG. 2, for example, the data value, "0011", of the control data signal is extracted. The child station output section 14 provides data in the data values that corresponds to the child station 11 to the corresponding controlled section 16.

On the other hand, the child station input section 15 comprises power-supply voltage generation means (CV) 150, a line receiver 151, control data signal extraction means 152, child station address setting means 153, address extraction means 154, an input data section 155 supervisory data signal generation means 156, and a line driver 157, as shown in FIG. 4.

As can be seen from FIG. 4, the configuration and operation of the components from power-supply voltage generation means 150 to the address extraction means 154 is substantially the same as that of the components from the power-supply voltage generation means 140 to the address extraction means 144. The power-supply voltage generation means 150 electrically drives circuits constituting the child station input section 15 and generates power-supply voltage Vcc from power line $P_{24}$ for electrically driving circuits constituting the child station input section 15 and a sensor section 17 in the corresponding controlled device 12. The power-supply voltage generation means 150 generates power-supply voltage Vcc from the serial pulse voltage signal on the first data signal line, D+, for electrically driving low-power-consuming circuits (an LED indicator circuit, for example) associated with the child station input section 15, which are not shown.

The input data section 155 holds a supervisory signal formed from one or more (bits) data values input from the corresponding sensor section 17. When an address is input to the input data section 155 from the address extraction means 154, the input data section 155 outputs one or more data values which it holds to a supervisory data signal generation means 156 as serial signals in a predetermined order. That is, the input data section 155 performs parallel-serial conversion on the supervisory signal. The supervisory data signal generation means 156 outputs a supervisory data signal according to the data value of the supervisory signal. The supervisory data signal output by the supervisory data signal generation means 156 is provided onto the first data signal line, D+, by the line driver 157, which is an output circuit. Therefore the supervisory data signal is superimposed on the data value of the control signal provided on the firs data signal line, D+, at that point of time. That is, the supervisory data signal is superimposed on the serial pulse voltage signal at a position of data corresponding to the child station 11. In other words, a data value of the supervisory signal is superimposed on a data value of the control signal that has the same address as that of the data value of the supervisory signal.

As shown in FIG. 2, the child station input section 15, under the control of timing signal, creates a supervisory data signal formed from a binary level different from the power-supply voltage according to the value provided by the sensor section 17 and superimposes it on a predetermined position of the serial pulse voltage signal as the data value of the supervisory signal. For example, a supervisory signal is created and superimposed on the predetermined position during one period of the clock CK if the value of the supervisory data signal is "1", or no supervisory data signal is created or superimposed if the value is "0". Therefore, if the data value of the supervisory data signal is "0101", the output (detection current) from the supervisory signal detection means 1311 would be as shown in FIG. 2 as a result of the superimposition of the supervisory data signal by the line driver 157.

Figure 6:
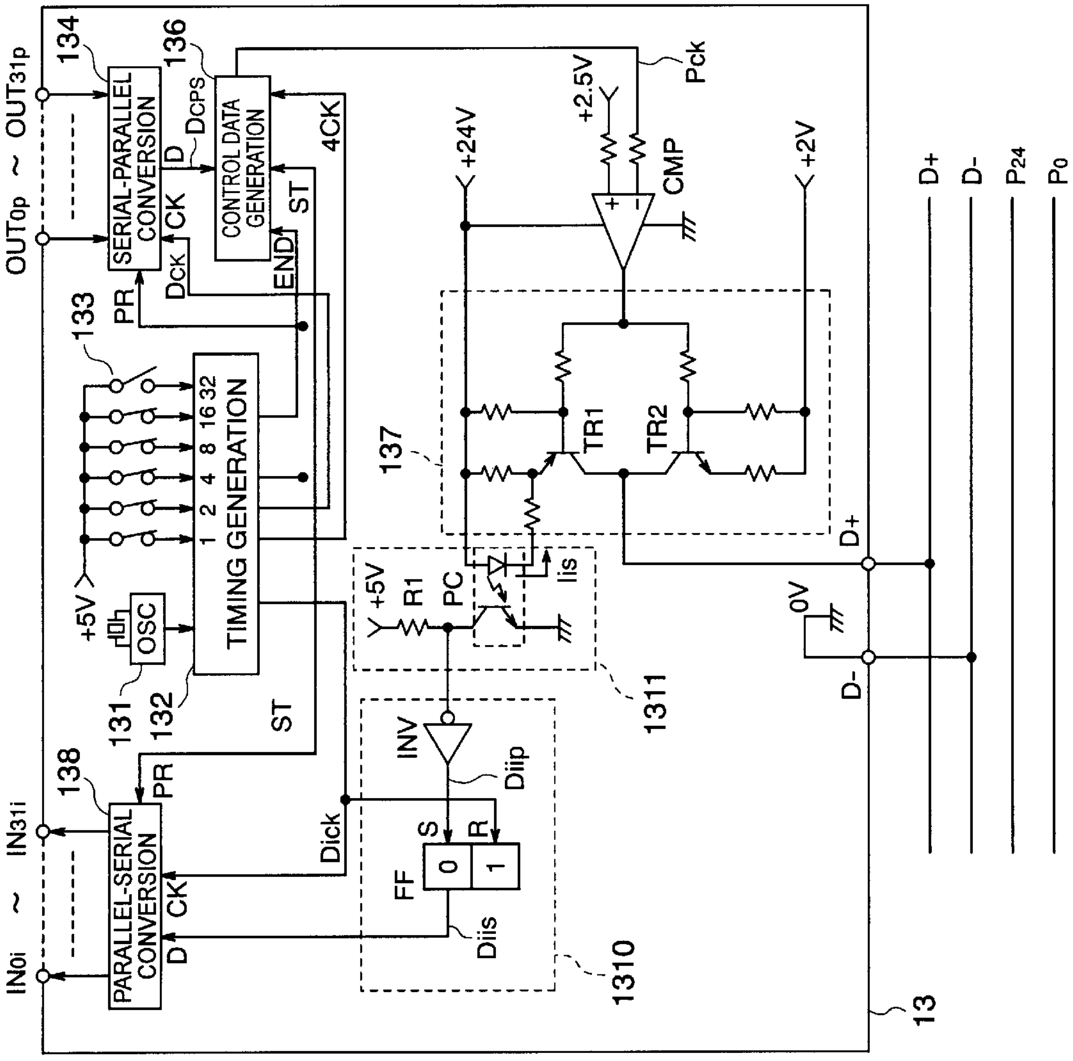
Figure 7:
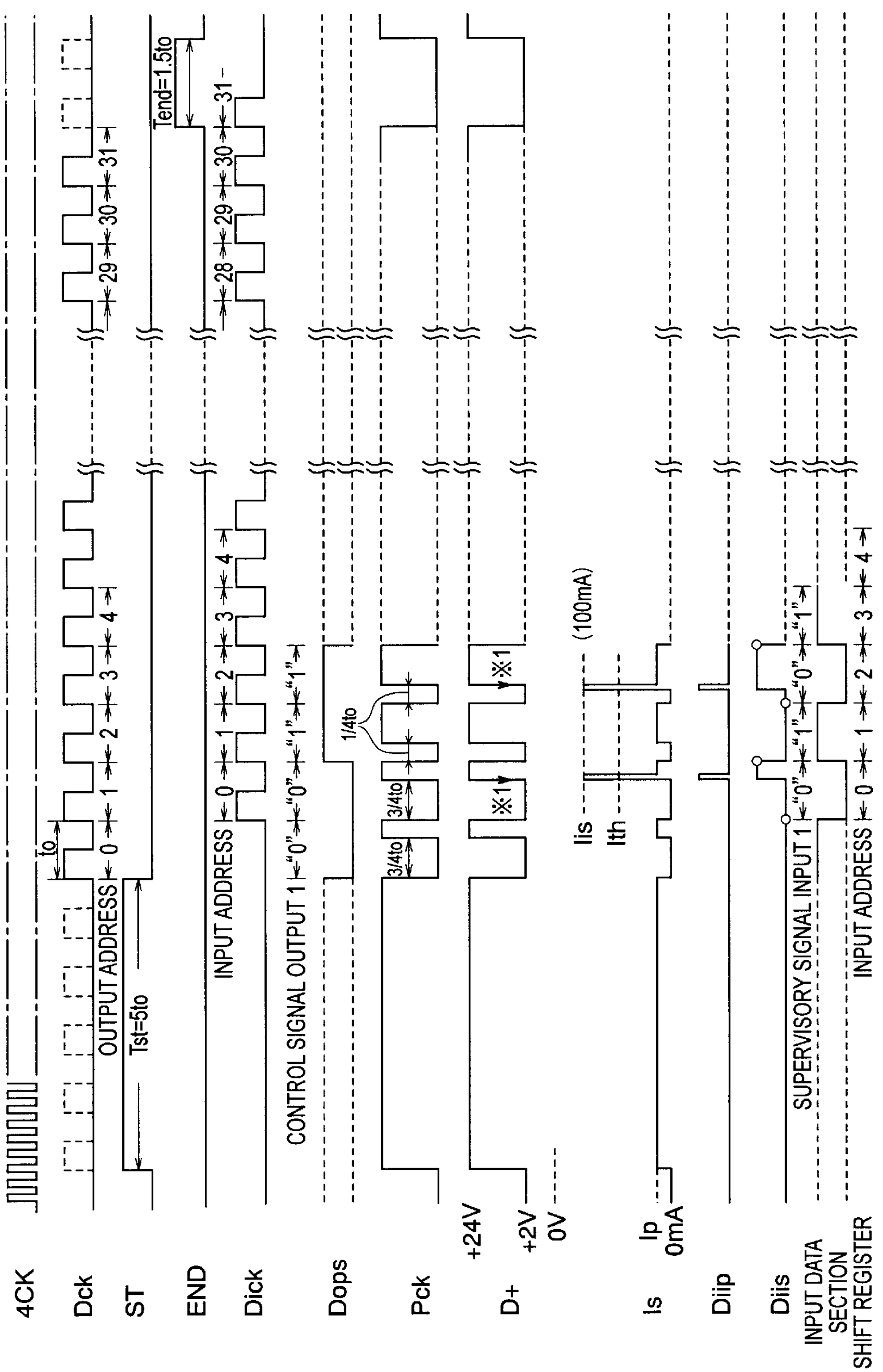
Figure 9:
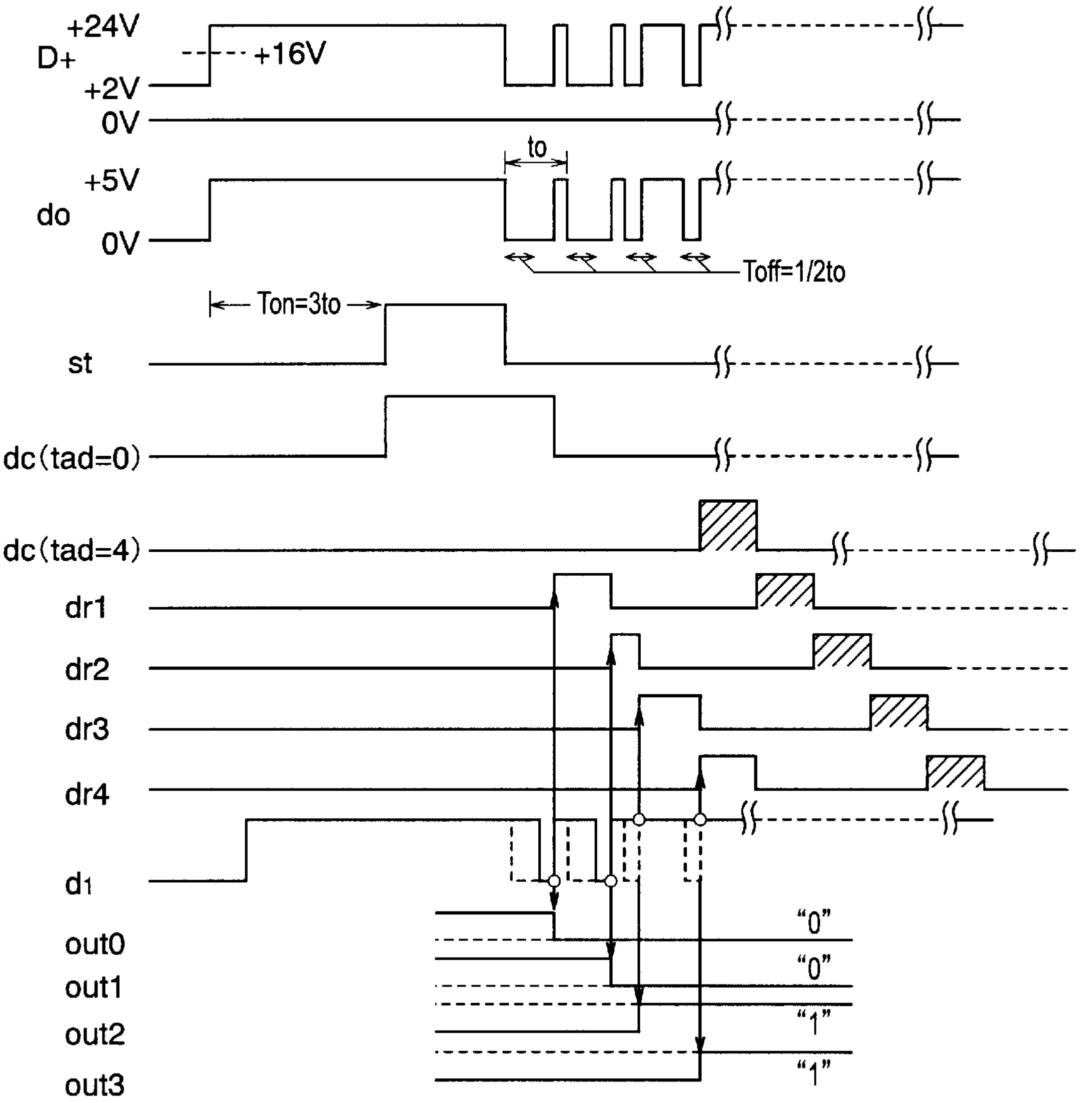
Figure 11:
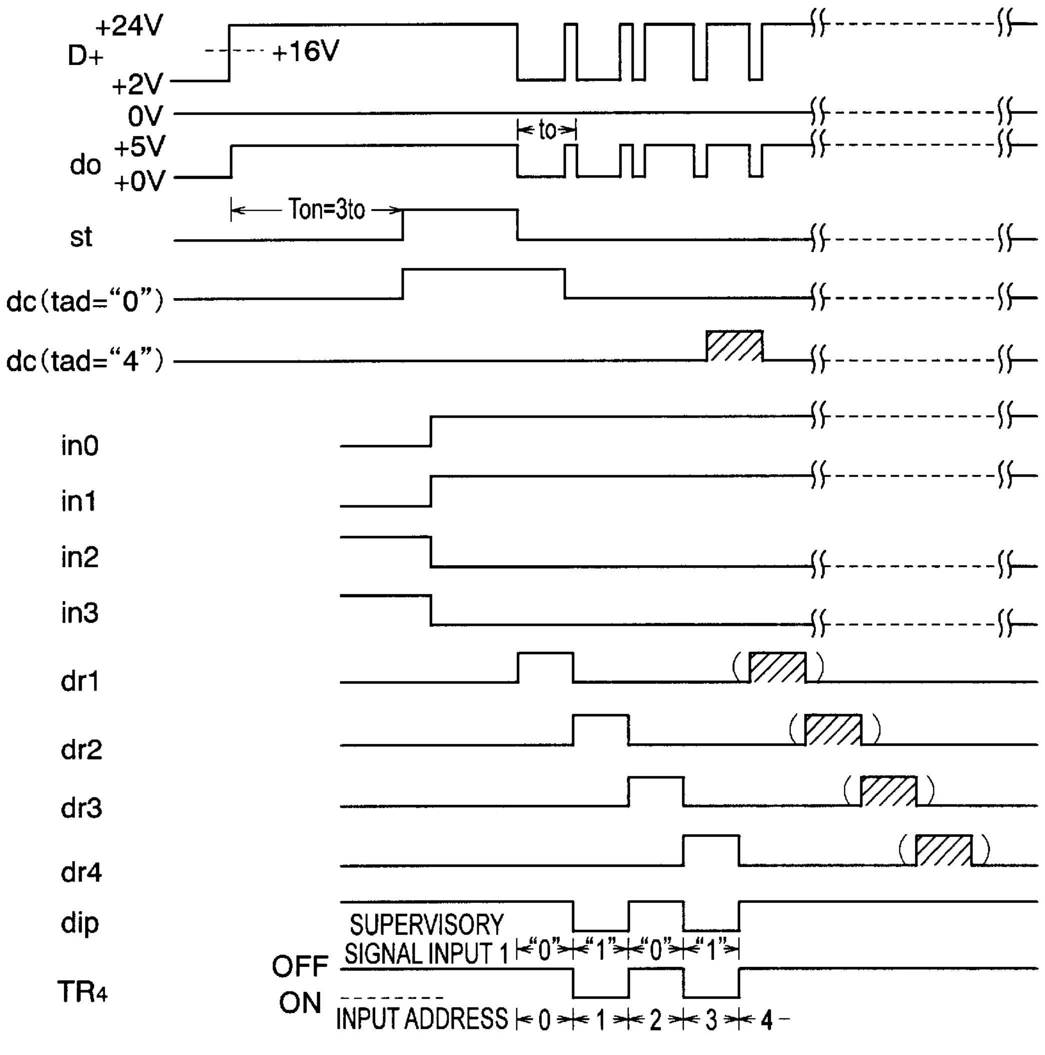

The specific configuration and operation of this example from the output of a control signal from the controller 10 to the input of a supervisory signal into the controller will be described below with respect to FIGS. 6 to 11. FIG. 6 shows a configuration of an example of a parent station 13. FIG. 7 is a waveform diagram of signals in the parent station 13 shown in FIG. 6. FIG. 8 shows a configuration of an example of the child station output section 14. FIG. 9 is a waveform diagram of signals in the child station output section 14 of FIG. 8. FIG. 10 shows a configuration of an example of the child station input section 15. FIG. 11 shows a waveform diagram of signals in the child station input section 15 shown in FIG. 10. The waveforms of the signals transmitted bidirectionally in this example is as shown in FIG. 2.

First, the parent station output section 135 will be described. In FIGS. 6 and 7, the timing generation means 132 outputs a start signal, ST, a predetermined number of clocks, CK, and an end signal, END. Start signal ST (at low level) is output in response to the input of a predetermined command (not shown) from the controller 10, for example. The operation of the timing generation means 132 is halted similarly in response to the input of another predetermined command (not shown) from the controller 10. 5t0 is chosen as the length of the period during which start signal ST is output so that start signal ST can be distinguished from clock CK. Here, t0 is the time length of one period of clock CK. Clock CK is provided by frequency-dividing an oscillation output from an oscillator 131 so as to have a predetermined periodicity. Clock CK is started to be output immediately after start signal ST in synchronization with its falling edge and a predetermined number (which is the number of addresses) of clocks CK are output. Therefore the timing generation means 132 includes counter means (not shown). The counter means starts counting on the rising edge of start signal ST. When the count output from the counter means reaches a predetermined value, the output of clock CK is stopped. Following the detection of the predetermined number (the number of addresses) of clocks CK, end signal END is output. The timing generation means 132 has comparator means (not shown) for accomplishing this. The comparator means compares the count output from the counter means with the address set by the address setting means 133 and, if they match with each other, outputs end signal END for a predetermined period. The period during which the end signal END is output is set to 1.5t0 in order to distinguish the end signal END from clock CK. The output of the end signal END resets the counter means. Start signal ST is output again in synchronization with the end of the output of end signal END, then the same operation is repeated. The maximum address value corresponds to the number of data items transmitted during one transmission period (from one start signal ST to the end signal END immediately after the start signal ST) and is the address of the parent station 13. One item of data corresponds to one clock.

Assuming that the addresses (the number of data items of the above-mentioned control signal) are 0 through 31, for example, control signals OUT0 through OUT31, which are 32-bit parallel data, are input from the output unit 102 to the output data section 134. In this case, the output data section 134 comprises a 32-bit shift register, which shifts control signals OUT0 through OUT31 in synchronization with clock CK at the falling edge of start signal ST and outputs them as output Dops in this order. The addresses may be 0–63, 127, 255, . . . The input of control signals OUT0 through OUT31 is switched (updated) in synchronization with start signal ST, for example. The maximum address (address 31) is set in the address setting means 133. This enables end signal END to be provided onto a signal line, Pck, in accordance with the completion of processing data at address 31 of the control signal. The address setting means 133 closes five positions of a weighted switch from the left as shown in FIG. 6 to provide a high-level signal, "111110" to set address 31 (the same applies to other cases).

Output Dops is driven high level (or "1") or low level (or "0") at every clock according to the data value of control signals OUT0 through OUT31. This enables a signal, "0011 . . . ", for example, to be output. Output Dops is input into the control data signal generation means 136. Start signal ST and end signal END are also input into the control data signal generation means 136.

The timing generation means 132 creates clock 4CK having a frequency (4f0) four times higher than that of clock CK by frequency-dividing an oscillation output from an oscillator 131. The data pulse signal generation means 136 counts clocks 4CK with a counter (not shown) and, if the value of control signals OUT0 through OUT31 is "1", outputs a pseudo ground level, 0+, only during the first one period of clock 4CK and outputs high level Vx during the other three periods of clock 4CK onto the first data signal line D+. On the other hand, if the value is "0", it outputs the pseudo ground level 0+ during the first three periods of clock 4CK and outputs high level Vx only during the rest, one period of clock 4CK. This allows the data pulse signal generation means 136 to perform pulse-width modulation (PWM) of clock CK based on control signals OUT0 through OUT31.

The output from the data pulse signal generation means 136 is a binary (+5V and 0V) signal and is provided onto a single signal line, Pck. The signal output onto signal line Pck is input into the line driver 137 through a comparator, CMP, then output onto the data signal line, D+ (and D−). The line driver 137 consists of complementary-connected transistors TR1 and TR2 and is capable of driving at low impedance. A photocoupler PC, which is the supervisory signal detection means 1311, is connected to the emitter of transistor TR1. Comparator CMP inverts output Pck and the line driver 137 performs level-conversion and inversion on the signal (inverted output Pck). The amplitude of an output from the line driver 137 is limited to a value in the range 2 to 24 V. It outputs a signal similar to the signal on signal line Pck. Therefore, a signal on the first data signal line, D+, is also a binary (level Vx and 0+) signal. The potential of the second data signal line, D−, is 0 V (ground level 0−). Start signal ST is provided as a signal at power-supply potential Vx and end signal END is provided as a signal at pseudo ground level 0+, onto the first data signal line D+.

The child station output section 14 will be described below. In FIGS. 8 and 9, a signal on the first data signal line D+ is mainly input into the line receiver 141. The power-supply voltage generation means 140 generates power-supply voltage Vcc (5 V) and an output 12 V to the line receiver 141, as described earlier.

The line receiver 141 comprises a current limiter circuit which is connected to the data signal line and the status of which changes according to a serial pulse voltage signal, and a photocoupler, PC1, which detects and outputs the pulse voltage signal according to the status of the current limiter circuit. The current limiter circuit consists of transistors TR1 and TR2. The breakdown voltage of Zener diodes ZD1 and ZD2 are 12 V (the value of power supplied to PC1, TR1, and TR2) and 16 V (about the mid-value between 24 V and 12 V), respectively. Diode D connected to the power-supply voltage generation means 140 rectifies a voltage from the power-supply voltage generation means 140 and Zener diode ZD1 provides a DC voltage (12 V). Zener diode ZD 2 detects a voltage above 16 V of a pulse voltage signal.

By adding the power-supply voltage generation means 140 constituted of a power line to supply power-supply voltage and the current limiter circuit the line receiver 141 in addition to photocoupler PC1, a current (receiver current) passing through the data signal lines D+ and D− can be reduced. That is, a constant current consumed in the transistors TR1 and TR2 for driving photocoupler PC1 is obtained from the power-supply voltage generation means 140. The constant current is not affected by nose because it is isolated from the power line by a transformer. Therefore the number (fan-out) of child stations 11 that can be coupled to the first data signal line D+ can be increased. By configuring the current limiter circuit as a constant-current circuit as shown and connecting the Zener diode and a high resistance between the first data signal line D+ and the base of transistor TR1, current consumption in the current limiter circuit is reduced to a remarkably small amount and stabilized.

Given control signals out0 through out3l (serial pulse voltage signal) on which clock CK is superimposed, the photocoupler PC1 outputs a low-level signal if a signal on the first data signal line D+ is 16 V or more. Otherwise, it outputs a high-level signal. Its inversion is signal d0, that is, the value of a demodulated control signal. This may be considered as including phase-modulated clock CK. Signal d0 provided based on an output from the line receiver 141 is input into a preset forward counter 1432 and a shift register 144. The waveform of signal d0 is that of pulse-width modulated clock CK based on control signals out0 through out31, as shown in FIG. 9. Because power-supply voltage Vcc is supplied from CV, the high-level value of signal d0 is 5 V.

Before this, start signal ST is similarly detected as the high level of signal d0 and input into an on-delay timer Ton. The delay is 3t0. That is the rising edge of output st is delayed by 3t0 and the falling edge is synchronized with its original signal ST. Thus, the amount of time during which end signal END or clock CK is kept high is small, and therefore output st does not appear. Output st is input into a differentiating circuit δ and a differential signal is input into the preset forward counter 1432 and shift register (SR) 144 on the rising edge of output St and used as its reset signal, R. Signal d0 (therefore extracted clock CK) is also input into them.

Start signal ST is detected by a Schmitt circuit (not shown). When an inverted start signal ST (a signal having a period five time longer than a clock period) is input into a comparator (not shown, comparing an input voltage with a voltage of 2.5 V), the comparator provides a detection output. This output is used to determine time in a time-constant circuit formed from resistance R and capacitor C. After a predetermined time is expired, an output is provided from the Schmitt circuit to clear a counter and the subsequent clocks CK detected in the comparator are countered by the counter. End signal END (a signal having a period 1.5 times longer than a clock period) is detected by another Schmitt circuit (not shown) in a similar manner.

An address, for example from address 0 to 3 (address 0 is indicated in FIG. 8) assigned to the child station output section 14 are set in the setting section 1431 of the child station address setting means 143. After the preset forward counter 1432 of the child station address setting means 143 is reset by a rising differential signal of output st, it counts extracted clocks CK on their rising edge and keep A providing output dc as long as the count value matches the address in the setting section 1431. That is, the signal is driven high in synchronization with the rising edge of clock CK in the period of the preceding address and driven low in synchronization with the rising edge of clock CK in the period of the assigned address. For address 0, because the signal is driven high in synchronization with the rising edge of output st, it would be as shown in FIG. 9. For reference, high levels for address 4 are indicated with shades. It can be seen that the timings are shifted by one clock. Output dc is input into the shift register 144.

On the other hand, signal d1 is output by an off-delay timer, Toff, into which signal do is input. Off-delay timer Toff outputs the signal with a predetermined delay only in an "off" (low) period. That is, it delays the falling of input do and synchronizes the rising edge with original input do. The delay is ½t0. Therefore pseudo ground level 0+ of signal d1 in the first ¼ period of the clock does not appear (the signal is kept high) in the case where the data value of the control data signal is "1" because the "off" period is short. In the case where the data value of the control signal is "0", pseudo ground level 0+in the first ¾ period of the clock remains because the "off" period is long. That is, pseudo ground level 0+ appears in signal d1 only in (¾−1/2)=¼ period.

The shift register 144 shifts "1" (or high) in synchronization with the rising extracted clock CK during a period in which output dc is high. That is, "1" is shifted in unit circuits Sr1 to Sr4 of the shift register 144 in this order. Therefore outputs dr1 through dr4 from the shift register 144 are driven high in synchronization with the rising edge of the clock CK in sequence (until the rising edge of the next period). Outputs dr1 through dr4 are input as clocks into D− type flip-flop circuits FF1 through F4, respectively.

Signal d1 (the data value of a demodulated control signal) is input into flip-flop circuits FF1 through FF4, which are the output data section 145. Therefore flip-flop circuit FF1 obtains and holds the value of signal d1 in synchronization with the rising edge of output dr1 and outputs it. In this case it outputs a low. Similarly, the other flip-flop circuits, FF2 through FF4 obtain and hold the current value of signal d1 and output it. This allows a data value, "0011", of the control signal at address 0 through address 3 is demodulated into signals out0 through out3.

The child station input section 15 will be described below. Comparing with FIGS. 4 to 8, the configuration from the power-supply voltage generation means 150 to the address extraction means 154 in FIGS. 10 and 11 are substantially the same as the configuration from the power-supply voltage generation means 140 to the address extraction 144. An address assigned to the child station input section 15 is the same as that of the child station output section 14, for example (in this case address 0 through address 3). Items of supervisory signal data are input as many as (four) extracted items of control signal data.

The input data section 155 comprises a plurality of (four) two-input AND gates, the number of which is the same as that of assigned addresses, address 0 through address 3, and an OR gate receiving outputs from these AND gates. Outputs dr1 through dr4 from a shift register 154, which is address extraction means 154, are input into the four AND gates as shown in FIG. 10. Outputs dr1 through dr4 are driven high in synchronization with the falling edge of the clock CK period in sequence (until the falling edge of the next period) as described earlier. Therefore each of the four AND gate opens during a period in which outputs dr1 through dr4 are high to force supervisory signals in0 through in3 to be output in this order from the OR gate through the AND gates. Supervisory signals in0 through in3 correspond to controls signals out0 through out3.

The output from the OR gate is input into a two-input NAND gate 1562. An output from inverter INV2, that is, inverted signal d0, is input into the NAND gate 1562. The NAND gate 1562 forms supervisory signal generation means 156. Supervisory signals in0 through in3 take a value, "0101", as shown in FIG. 11, during a period in which outputs dr1 through dr4 is high. Therefore, the NAND gate 1562 opens in synchronization with the falling edge of signal d0 during the period in which supervisory signal in0 through in3 are output to allow supervisory signals in0 through in3 which take the value, "0101", to be output as an output, dip.

Output dip is output onto the first data signal line D+ after being subject to level conversion through the line driver 157. That is, output dip is electrically isolated from the above-described clock extraction section by a photocoupler, PC2, then input into transistor TR3 constituting a level-conversion circuit and input into output transistor TR4. When photocoupler PC2 is turned on, transistors TR3 and TR4 is turned on. This allows a signal proportional to signal dip to be output onto the first data signal line D+. The high of the supervisory signal depends on the signal potential on the data signal line D+ because the resistance of transistor TR4 becomes high as it is turned off and the low level is 4 V (because the breakdown voltage of Zener diode ZD2 is 3 V) because the resistance of transistor TR4 becomes low as it is turned on.

As apparent from the description above, the supervisory signal is output (superimposed) onto the first data signal line D+ from the child station input section 15 in one period of (extracted) clock d0. However, the voltage value of the signal on the first data signal D+ is forced to be the voltage value of a control signal regardless of the voltage value of the supervisory signal. Thus, the line driver 137 of a parent station output section 135 has a driving ability (the ability of supplying a current) sufficiently high enough to cancel the supervisory signal to force the voltage value of the first data signal line D+ to become equal to the voltage value of the control signal.

A current passing through transistor TR4 is limited. To accomplish this, a Zener diode, ZD3, and a resistance, R, are connected to the base of transistor TR4 as shown in FIG. 10. This limits the current passing through transistor TR4 to 100 mA or less, for example. Therefore the potential on the first data signal line D+ can easily be pulled up to near Vx=24 V by turning on transistor TR1 of the above-mentioned parent station output section 135. Because transistor TR4 is kept ON during this pull-up, a current of about 100 mA temporarily passes through the emitter of transistor TR1. The amount of time during which the current passes through the emitter is 2 microseconds, for example. This is detected as Iis.

The parent station input section 139 will be described below. Referring to FIGS. 6 and 7 again, a supervisory signal provided onto the first data signal line D+ is input into the supervisory signal detection means 1311 and its detection signal is inverted and output as signal Diip. The waveform of signal Diip includes (only) a supervisory data signal. In signal Diip, supervisory signal data corresponding to the address position of supervisory signal data exists on the same address position as that of the relevant control signal data.

The parent station input section 139 includes a current detection circuit which detects a variation in a current on the first data signal line D+ to output it as the supervisory signal detection means 1311. That is, a photocoupler, PC, is provided on the emitter side of transistor TR1 that constitutes a line driver 137 of the parent station output section 135, as shown in FIG. 6. The emitter of transistor TR2 constituting the line driver 137 is connected to a predetermined potential (pseudo ground level 0+, for example 2 V) without using a Zener diode. Photocoupler PC is the supervisory signal detection means 1311 and detects current Iis shown in FIG. 6. It detects the current passing through the emitter of transistor TR1 on the rising edge of power-supply voltage Vx. The value of emitter current Iis depends on the presence or absence of a contention current between the power-supply voltage Vx and a supervisory signal at the rising of the power-supply voltage Vx and is "0" or "1" of the supervisory signal by setting a predetermined threshold value. If the current passing through photocoupler PC is a predetermined value, Ith, or more during transistor TR4 of the child station input section 15 is turned on, photocoupler PC will be turned on.

Current signal Iis passing through photocoupler PC is converted into a voltage signal by a voltage drop in a collector resistance, R1, connected to photocoupler PC. Signal Diip is created by an inverter, INV, and input into the flip-flop, FF, of the supervisory data extraction means 1310. A signal, Dick, which is a clock delayed by one period of clock CK, is provided to flip-flop FF from the timing generation means 132. Thus, signal Diis output from flip-flop FF becomes a signal that provides only the value of a supervisory data signal for a period equal to ¼ or ¾ period of clock CK one period after the original clock CK. Signal Diis is input into the input data section 138.

The input data section 138 comprises a 32-bit register, takes input signal Diis into predetermined bits in a predetermined order, holds it until a new data value is input, then outputs it. Thus, signal Dick, which is provided one period after clock CK is input into the input data selection 138. This allows signal Diis to be held in the register of the input data section 138 during the period succeeding to original clock CK. Thus, supervisory signals INO through IN31, which are 32-bit parallel data at address 0 through address 31, are converted into serial signals and input into an input unit 101 from the input data section 138. Thus the supervisory signals are provided like "0101 . . . ".

By forcing a control signal to be provided, four states may be provided according to the combination of the supervisory signal, 0 or 1, and a control signal, 0 or 1, as shown in FIG. 12. Because the control signal sent can be known in the parent station 13, the status of the supervisory signal can be known by detecting a difference in a current on the first data signal line D+. The ampere of current Iis is determined by the supervisory signal, 0 or 1.

As shown in FIG. 12, emitter current Iis of transistor TR1 is about 100 mA when the supervisory signal is "1" because a contention current between the supervisory signal ant power-supply voltage Vx is provided. That is, because a current passing through transistor TR4 of the child station input section 15 shown in FIG. 10 is limited to the value, 100 mA, as described earlier, current Iis does not exceeds this value. On the other hand, current Iis becomes equal to current ip passing through the line receivers, which are power-supply voltage generation means, in the child station output section 14 and input section 15 when the supervisory signal is "0" because no contention current between the supervisory signal and power-supply voltage Vx is provided. That is, when a potential on the first data signal line D+ is forced to become equal to power-supply voltage Vx (=24 V), transistor TR4 of the child station input section 15 switches from on to off because no data signal is provided. Therefore, if power-supply voltage Vx is forced to be supplied while the supervisory signal is "1", pulse current Iis is provided. The assumption hire is that current consumption in the circuitry of the child station 11 is low and current ip is small.

Here, a threshold value, Ith= is to detect the value of current Iis is determined. The threshold value is the mid-value between the limited current (about 100 mA) of transistor TR2 in the child station input section 15 and current ip. This allows the supervisory signal, "1", to be detected if the value of current Iis is larger than the threshold value, or otherwise the supervisory signal, "0", to be detected. In practice, the threshold value can be provided by choosing an appropriate value as resistance R1 connected to photocoupler PC.

In particular, when the supervisory signal is "1" on the rising edge of power-supply voltage Vx as shown in FIG. 7, the transistor of photocoupler PC is turned on and the voltage of the collector resistance connected to photocoupler PC drops to input a low into inverter INV. Thus, a high pulse signal is input into the input data section 138 as signal Diis. The input data section 138 holds high signal Diis. This ensures that the supervisory signal, "1", to be detected.

On the other hand, if the supervisory signal is "0" on the rising edge of power-supply voltage Vx, the transistor of photocoupler PC is turned off and a high is input into inverter INV. Thus, the input data section 138 holds low signal Diis. That is, the supervisory signal, "0", is detected.

Second Embodiment

One (one channel) control signal and one supervisory signal are superimposed on a clock including a power-supply voltage in the first embodiment. In a second embodiment, two control signals and one supervisory signal are superimposed on a clock. That is, multiplexed (duplexed) control and (not-multiplexed) supervisory signal are provided onto a common data signal line and transmitted in two directions at the same time. In particular, an output data section 134 is added to provide two output data sections in total.

Figure 13:
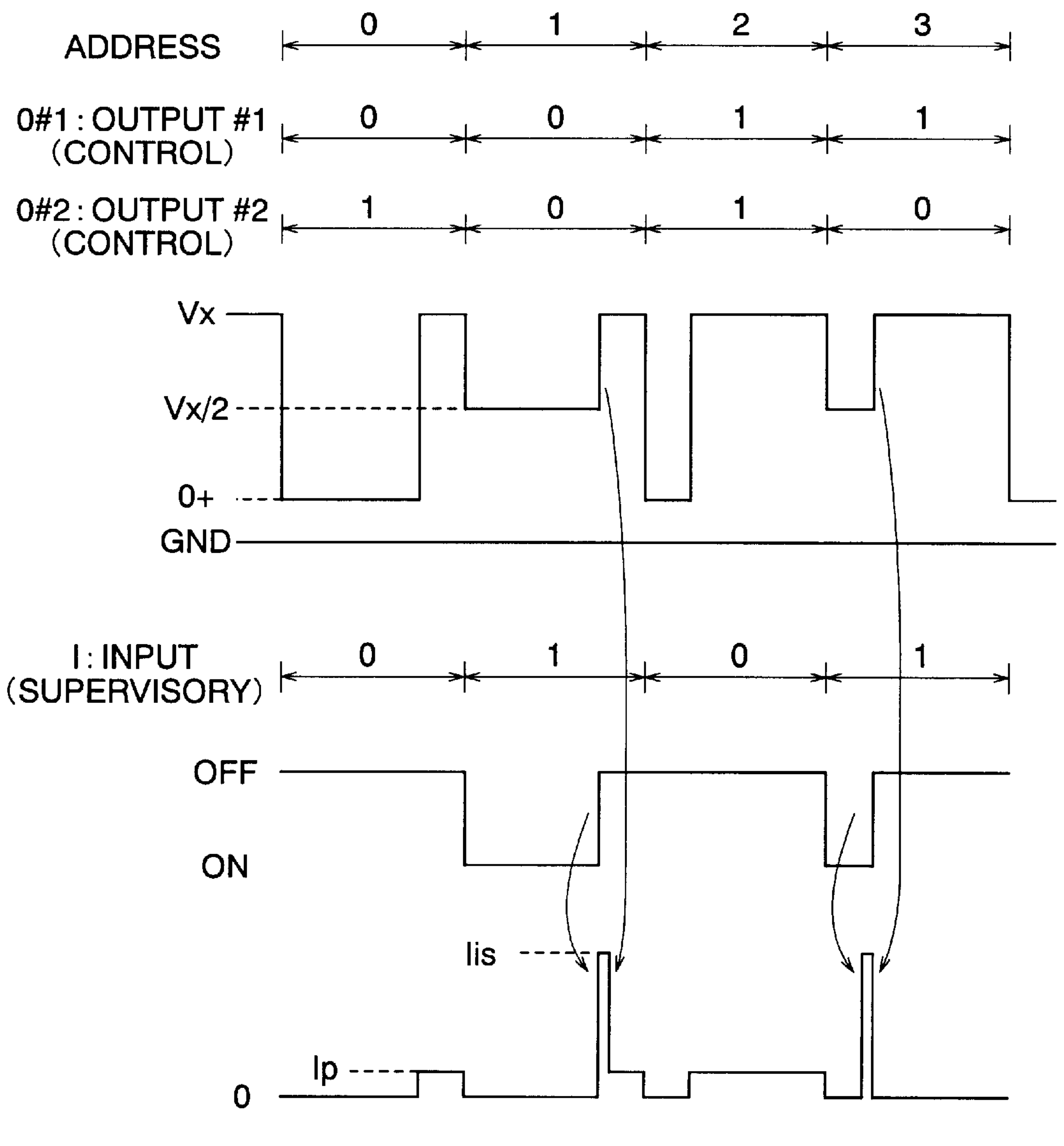
FIG. 13 is a diagram for illustrating signal transmission according to the present invention.

As shown in FIG. 13, parent station output section 135 converts, under the control of the timing signal, fist and second control signals into serial pulse voltage signals by changing (applying pulse-width modulation to) the duty ratio between a period of a voltage level other than a predetermined power-supply voltage level and the subsequent period of power-supply voltage level Vx in every period of the clock according to the data value of the first control signal input into a first output data section 134 from the controller 10 and changing (applying voltage modulation to) the level during the period of the level other than the power-supply voltage level at a predetermined level (Vx/2, for example) different form power-supply voltage Vx or a pseudo ground level, 0+, according to the data value of a second control data signal input form the controller 10 into the second output data section 134, and provides the converted signal onto the data signal line to provide the converted signals onto the data signal line.

A child station output section 14 determines, under the control of the timing signal in every period of the clock, the duty ratio between a period of voltage level different from the power-supply voltage level of a serial pulse voltage signal and the subsequent period of the power-supply voltage Vx level to extract the data values of a fist control data signal and provides data in that data values that corresponds to the child station to a corresponding controlled section 16. Alternatively, the child station output section 14 determines, under the control of the timing signal in every period of the clock, whether or not the level during the period of the level other than the level of a serial pulse voltage signal is either a predetermined voltage level (Vx/2, for example) different form power-supply voltage Vx or the pseudo ground level to extract the data values of a second control data signal, and provides data in that data values that corresponds to the child station to the corresponding controlled section 16.

For example, if the data value of a first control data signal, #1, is "0", it changes the first ¾ period of the clock to a predetermined level different from power-supply voltage Vx and changes the second ¼ period of the clock to the level of power-supply voltage Vx. If it is "1", it changes the first ¼ period of the clock to a predetermined level different from power-supply voltage Vx and changes the second ¾ period of the clock to the level of power-supply voltage Vx. By determining these levels, the data values of first control data signal #1 are extracted. In addition, the predetermined level different from power-supply voltage Vx is set to a level of Vx/2 if the data value of the second control data signal , #2, is "0", or it is set to pseudo ground level 0+if the value is "1". By determining these levels, data values of second control data signal #2 are extracted. Therefore, if the data values of the first and second control data signals #1 and #2 are "0011" and "1010", for example, the signals would be as shown in FIG. 13.

Figure 14:
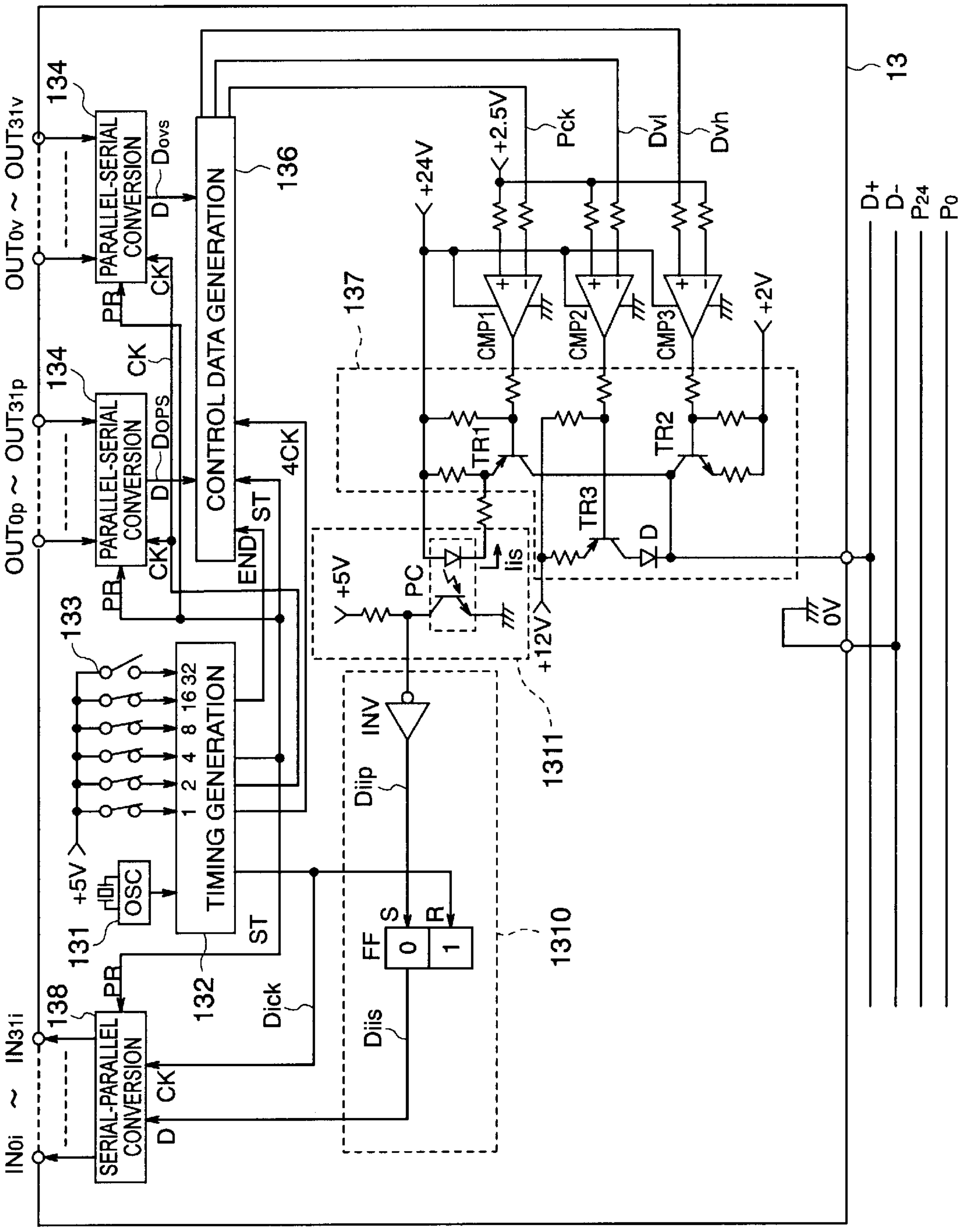
Figure 15:
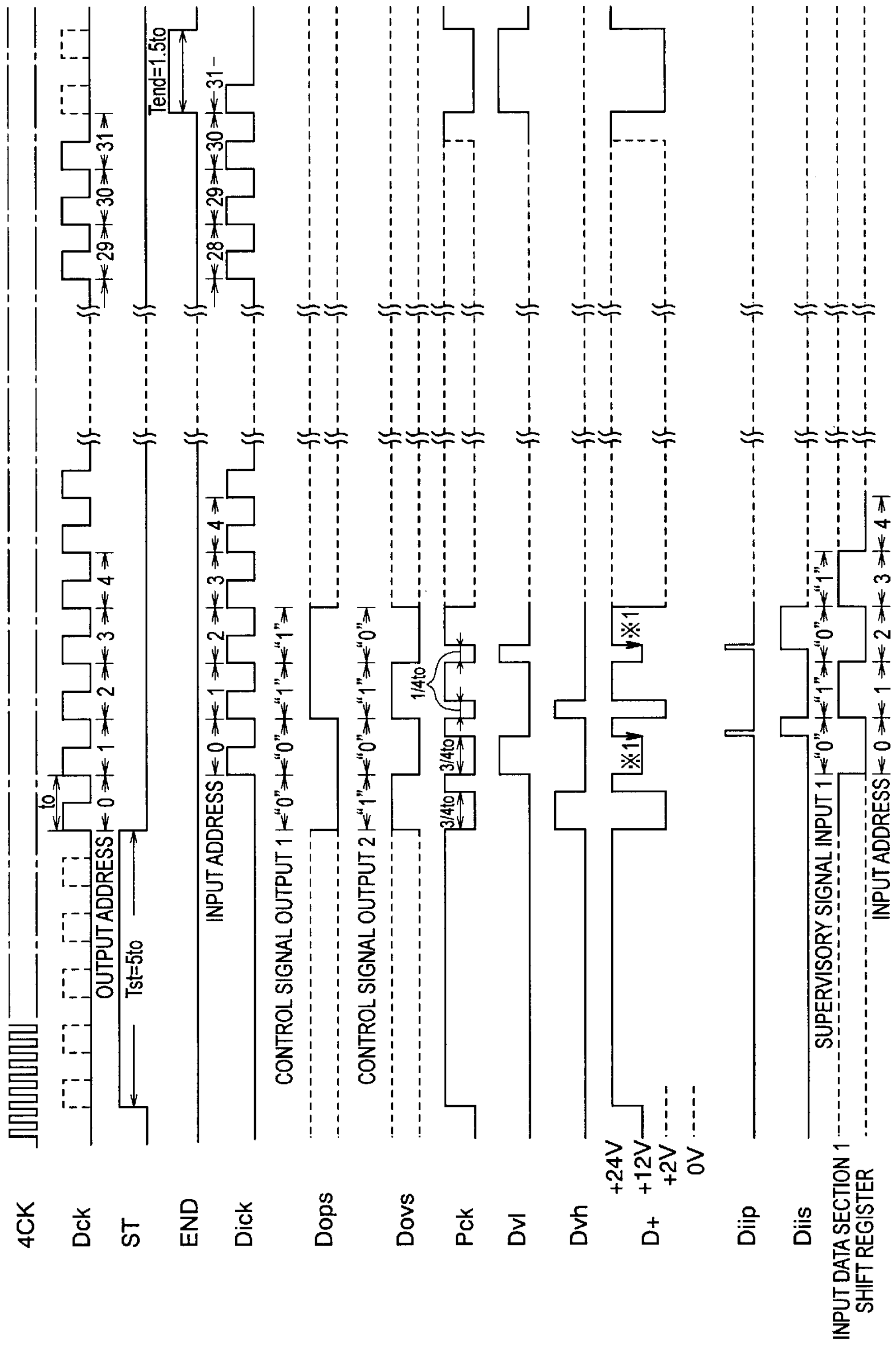
Figure 16:
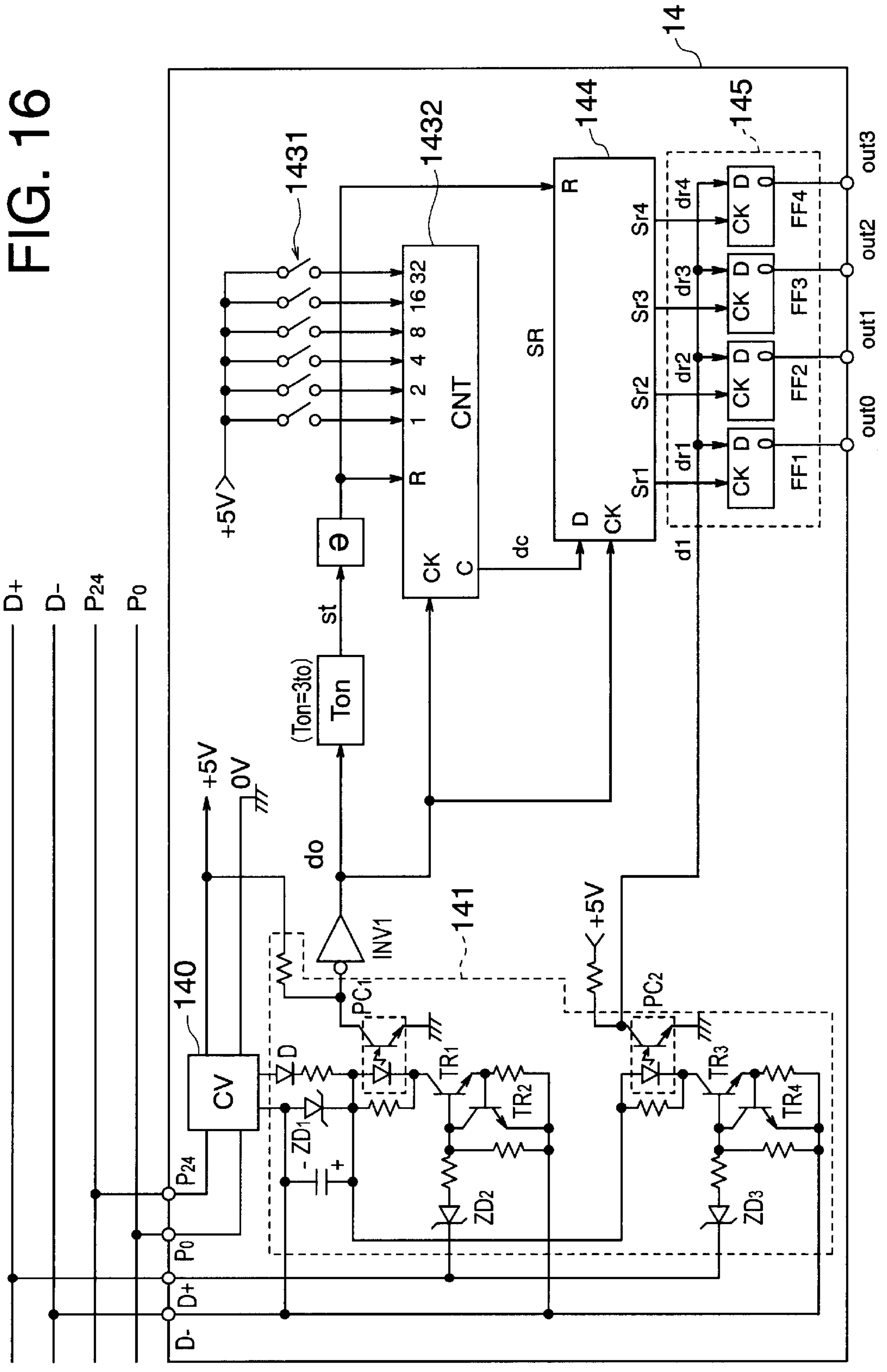
Figure 17:
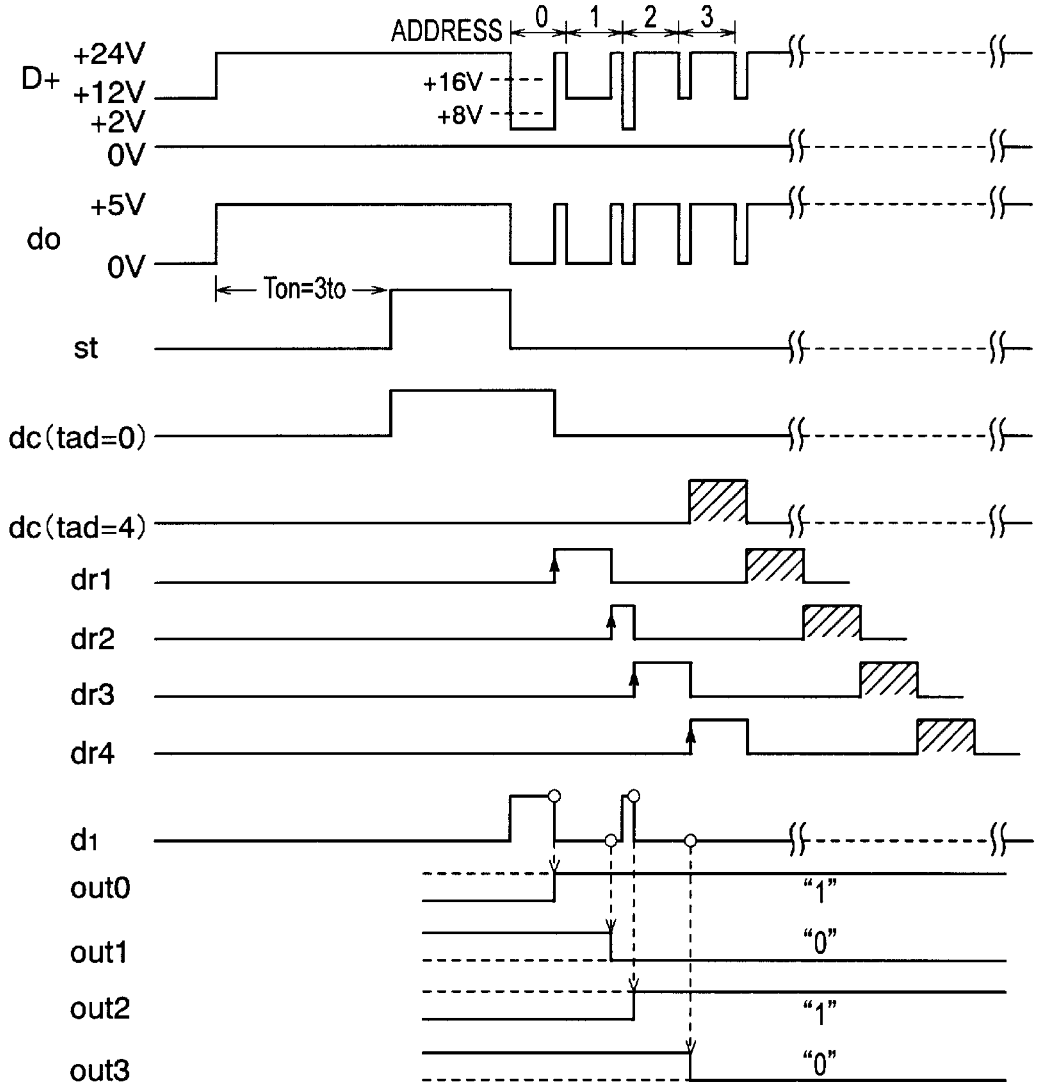

The configuration of the second embodiment is basically the same as that of the firs embodiment, except that a part of the configuration of the parent station 13 is different and that, besides the child station output section 14 in the configuration shown in FIG. 8, another child station output section 14 exists that has a configuration different from that in FIG. 8. FIG. 14 shows a configuration of one example of the parent station 13. FIG. 15 shows a waveform of signals in the parent station 13 shown in FIG. 14. FIG. 16 shows a configuration of another example of the child station output section 14 and FIG. 17 is a waveform diagram of signals in the child station output section 14 shown in FIG. 16. The child station output section 14 in the configuration shown in FIG. 8 detects and outputs pulse-width-modulated first control data signals #1 (OUT0p through OUT31p). The child station output section 14 in the configuration shown in FIG. 16 detects and outputs a voltage-modulated second control data signals #2 (OUT0v through OUT31v). The child station output section 14 shown in FIG. 8 and the child station output section 14 shown in FIG. 16 are at the same address in addresses (child station addresses) assigned to the child station 11. The child station output section 14 shown in FIG. 8 and the child station output section 14 shown in FIG. 16 at the same address may exist in the same child station 11 or in different child stations 11.

Referring to FIGS. 14 and 15, the parent station 13 in FIG. 14 is basically the same as the parent station 13 in FIG. 6, except that a slight difference exists because second control signals OUT0v through OUT31v are superimposed on clock CK in addition to first control signals OUT0p through OUT31p. The superimposition of the control signal OUT0p through OUT31p is substantially the same as that in the first embodiment.

Like signal Drops for first control signals OUT0p through OUT31p, a signal, Dovs, for second control signals OUT0v through OUT31v is constructed. A control data signal generation means 136 constructs a signal, Pck, based on signal Dops and constructs signals Dvl and Dvh based on signal Dovs (and Pck). That is, it constructs signal Dvl ("1") if the second control signal is low, or constructs signal Dvh ("1") if the second control signal is high, in a period during which signal Pck is low.

Pck, Dvl, and Dvh output from the control data signal generation means 136 are input into a line driver 137. The line driver 137 comprises comparators CMP1 through CMP3 and transistors TR1 through TR3. Transistors TR1 and TR3 are complementary-connected with transistor TR2, allowing for driving at low impedance. Transistor TR1 outputs voltage Vx, transistor TR2 outputs pseudo ground level 0+(2 V), and transistor TR3 outputs a voltage of Vx/2 . A photocoupler, PC, is connected to the emitter of transistor TR1.

The line driver 137 superimposes power-supply voltage Vx on output Pck based on output Pck and inputs Dvl and DVh by using transistor TR1 in a period during which output Pck is high, converts the level of the signals (Dvl and Dvh), and superimposes them. In particular, it converts "1 (Vcc=5 V)" of signal Dvl into a voltage of Vx/2 (12V) and converts "1 (Vcc=5 V) " of signal Dvh into pseudo ground level 0+(2 V, for example). The voltage, Vx/2 , or ground level 0 + is superimposed on signal Pck in a period during which it is low.

Start signal ST is outputs onto a first data signal line, D+, as a signal at power-supply potential Vx level. Because signal Pck is driven low based on end signal END to generate "1" of signal Dvl in the control data signal generation means 136, end signal END is outputs as a signal at Vx/2 level. Before outputting start signal ST, the potential of the first data signal line is forced to Vx/2.

As described above, pulse-width modulated first control data signal #1 output from the parent station 13 is detected and output (demodulated) by a child station output section 14 in the configuration shown in FIG. 8 that has an appropriate address. This operation is the same as that in the configuration of the first embodiment and therefore the description of which will be omitted. Voltage-modulated second control data signal #2 is detected and output (demodulated) by a child station output section 14 in the configuration shown in FIG. 16 that has an appropriate address.

Referring to FIGS. 16 and 17, the configuration of the child station output section 14 in FIG. 16 is basically the same as that of the child station output section 14 in FIG. 8 that detects first control signals OUT0p through OUT31p. In practice, however, it detects second control signals OUT0v through OUT31v, and therefore, it has a slightly modified configuration.

The child station output section 14 in FIG. 16 uses a configuration similar to that of the child station output section 14 in FIG. 8 to obtain signal d0 and further obtain outputs dr1 through dr4 from a shift register 144. Here, because the Zener voltages of Zener diodes ZD1 and ZD2 are 12 V and 16 V, respectively, as with the configuration in FIG. 8, the waveform of signal d0 is also as shown in FIG. 17 (which is the same as that in FIG. 9).

On the other hand, signal d1 in the child station output section 14 in FIG. 16 is formed by a line receiver 141. In particular, a circuit (signal d1 formation circuit) formed from a photocoupler, PC2 and transistors TR3 and TR4, similar to the circuit (signal d0 formation circuit) formed from photocoupler PC1 and transistors TR1 and TR2, provides signal d1. The signal d0 formation circuit is the same as the line receiver 141 shown in FIG. 8. The signal d1 formation circuit comprises a current limiter circuit which is connected to a data signal line and the status of which changes according to a serial pulse voltage signal, and a photocoupler, PC2, which detects and outputs a serial pulse voltage signal according to the status of the current limiter circuit. The current limiter circuit comprises transistors TR3 and TR4. The photodiode of photocoupler PC2 is connected with that of photocoupler PC1 in parallel. The breakdown voltages of Zener diodes ZD1, ZD2, and ZD3 are 12 V (the value of power-supply voltage to PC1, PC2, TR1, TR2, TR3, and TR4), 16 V (approximately the mid-value between 24 V and 12 V), and 8 V (approximately the mid-value between 12 V and 2 V), respectively.

Considering second control signals OUT0V through OUT31v, photocoupler PC2 uses Zener diode ZD3 to output a high if a signal on the first data signal line D+ is pseudo ground level 0+(2 V for example). Otherwise (Vx/2 , for example) it outputs a low. That ism it outputs high if the second control signal is "1", or a low if it is "0".

Signal d1 (that is, the data value of the demodulated control signal) is input into flip-flop circuits FF1 through FF4, which constitute an output data section 145. Therefore flip-flop circuit FF1, for example, takes in and holds the current value of signal d1 in synchronization with the rising edge of output dr1 and outputs it. In this case, it outputs a high. Similarly, the other flip-flop circuits FF2 through FF4 also takes in and holds the current value of signal d1 and outputs it. This allows the data value, "1010", of the control signals at address 0 through address 3 is demodulated into signals out0v through out3v.

Third Embodiment

While in the second embodiment two control signals and one supervisory signals are superimposed on a clock including a power-supply voltage, two control signals and two supervisory signals are superimposed on a clock in a third embodiment. That is, a multiplexed (duplexed) control signal and a multiplexed (duplexed) supervisory signal are provided onto a common data signal line and transmitted in two directions at the same time. In other words, the control signal and the supervisory signal are fully duplexed to provide a four-channel data transmission path. In particular, one input data section 138 is added to provide two input data sections in total.

Figure 18:
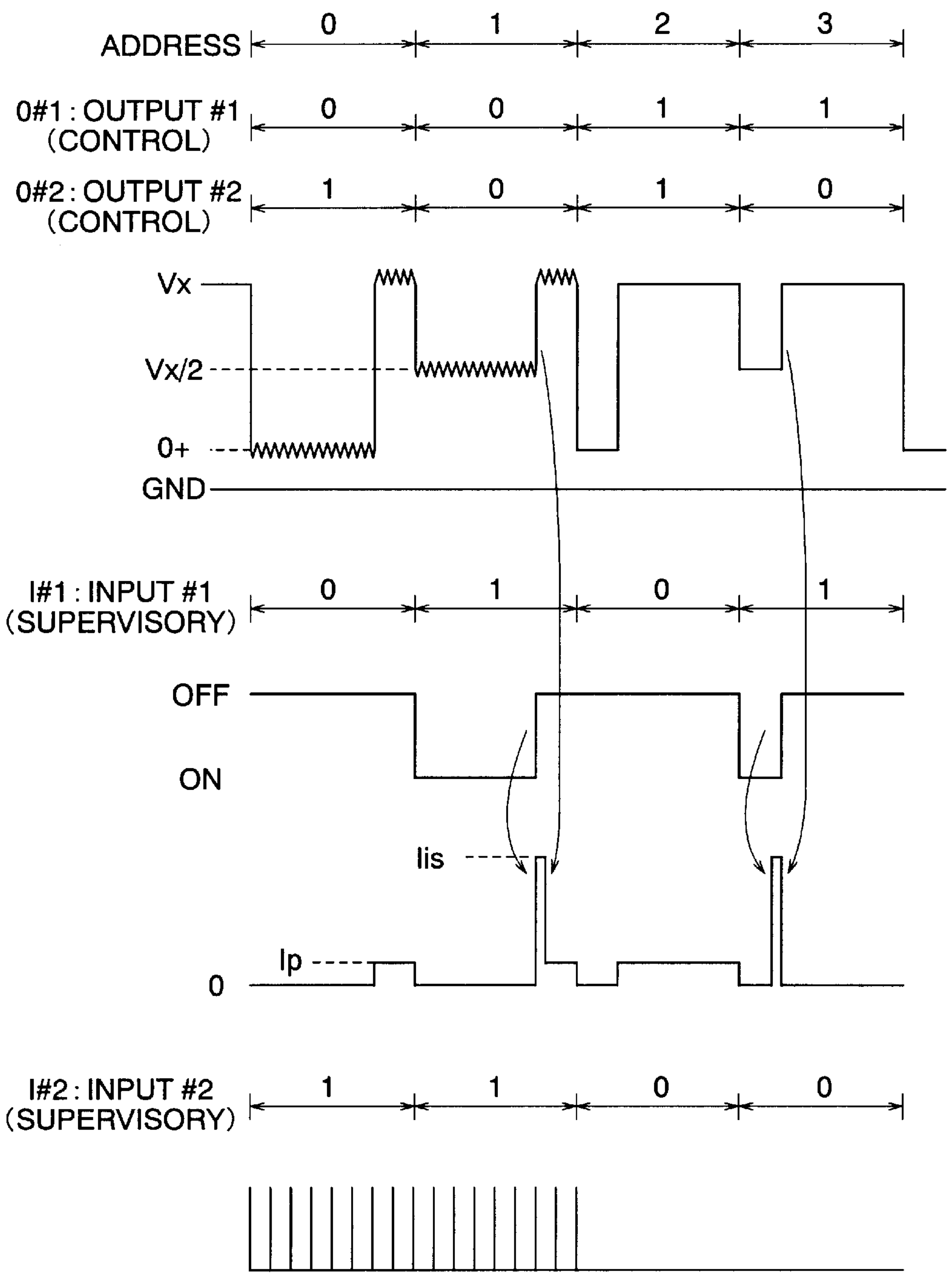
FIG. 18 is a diagram for illustrating signal transmission according to the present invention.

As shown in FIG. 18, a child station input section 15 forms a first supervisory data signal, #1, constituted of a binary level different from a power-supply voltage, Vx, according to a value in a corresponding sensor section 17 under the control of a timing signal and superimposes it on a predetermined position of a serial pulse voltage signal as the data value of the first supervisory data signal. Alternatively, the child station input section 15 forms a second supervisory data signal, #2, constituted of a frequency signal according to a value in corresponding sensor section 17 under the control of the timing signal and superimposes it on a predetermined position of a serial pulse voltage signal as the data value of the second supervisory data signal.

A parent station input section 139 detects under the control of the timing signal the first supervisory data signal #1 superimposed on the serial pulse voltage signal transmitted over the data signal line in every clock period as the presence or absence of a current signal, Iis, generated by contention between the supervisory data signal and the power-supply voltage on the rising edge of the power-supply voltage level, Vx, and detects the second supervisory data signal, #2, constituted of the frequency signal superimposed on the serial pulse voltage signal transmitted over the data signal line. It extracts the data values of the serial first and second supervisory data signals, converts them into. supervisory signals, and inputs it into a controller 10 through the first and second input data sections 138.

For example, if the data value of the first supervisory data signal, #1, is "0", a supervisory data signal that does not generates current signal Iis by contention between it and power-supply voltage Vx is superimposed. If the data value is "1", a supervisory data signal that generates current signal Iis by contention between it and power-supply voltage Vx is superimposed. By determining this, the data values of the first supervisory data signal #1 are extracted. In addition, if the data value of the second supervisory data signal, #2, is "0", the frequency signal is not superimposed. If the data value is "1", the frequency signal is superimposed. By determining these, the data values of the second supervisory data signal, #2, are extracted. Thus, if the data values of the first and second supervisory data signals, #1 and #2, are "0101" and "1100", respectively, the signals would be as shown in FIG. 18.

Figure 19:
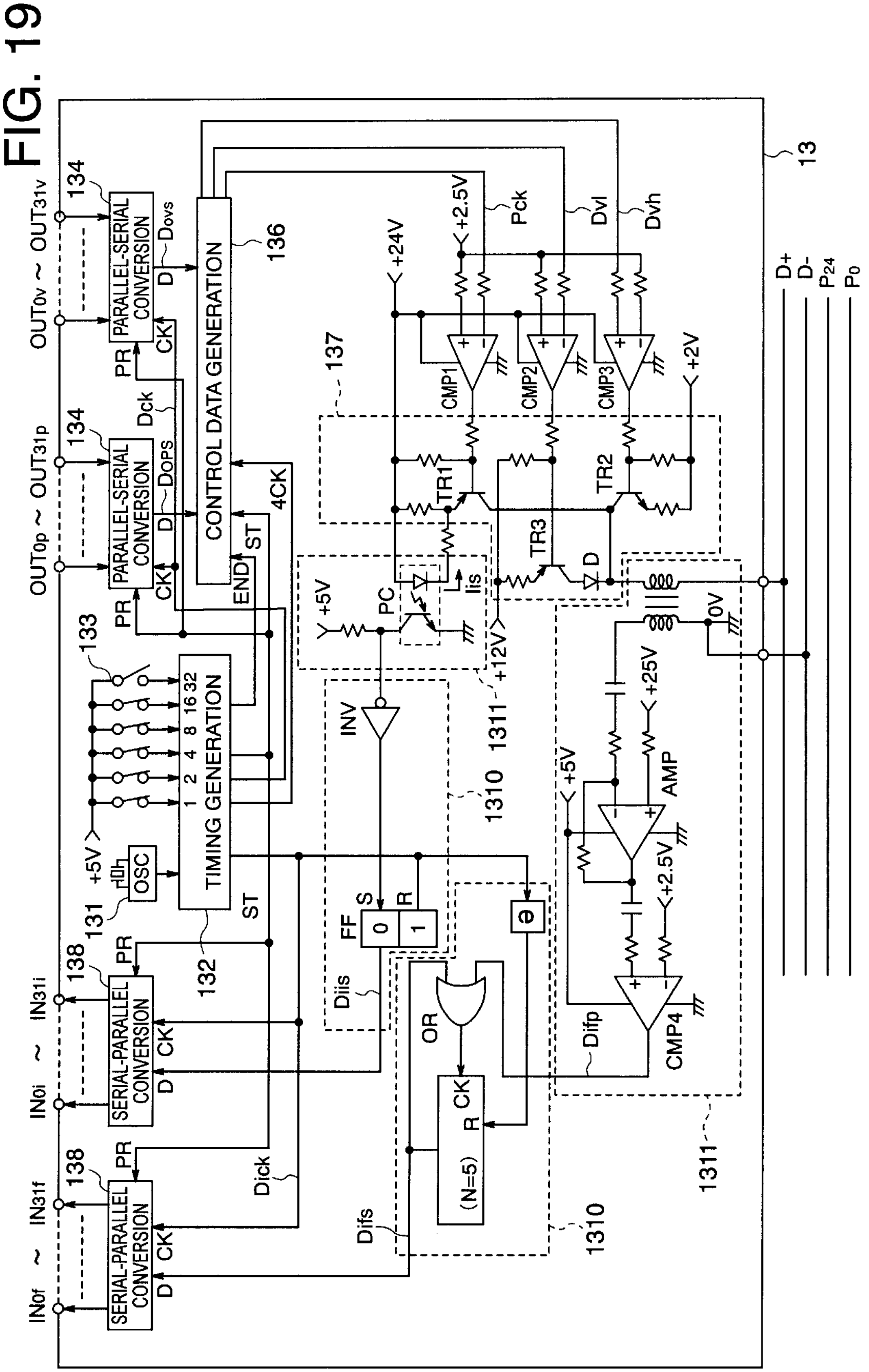
Figure 20:
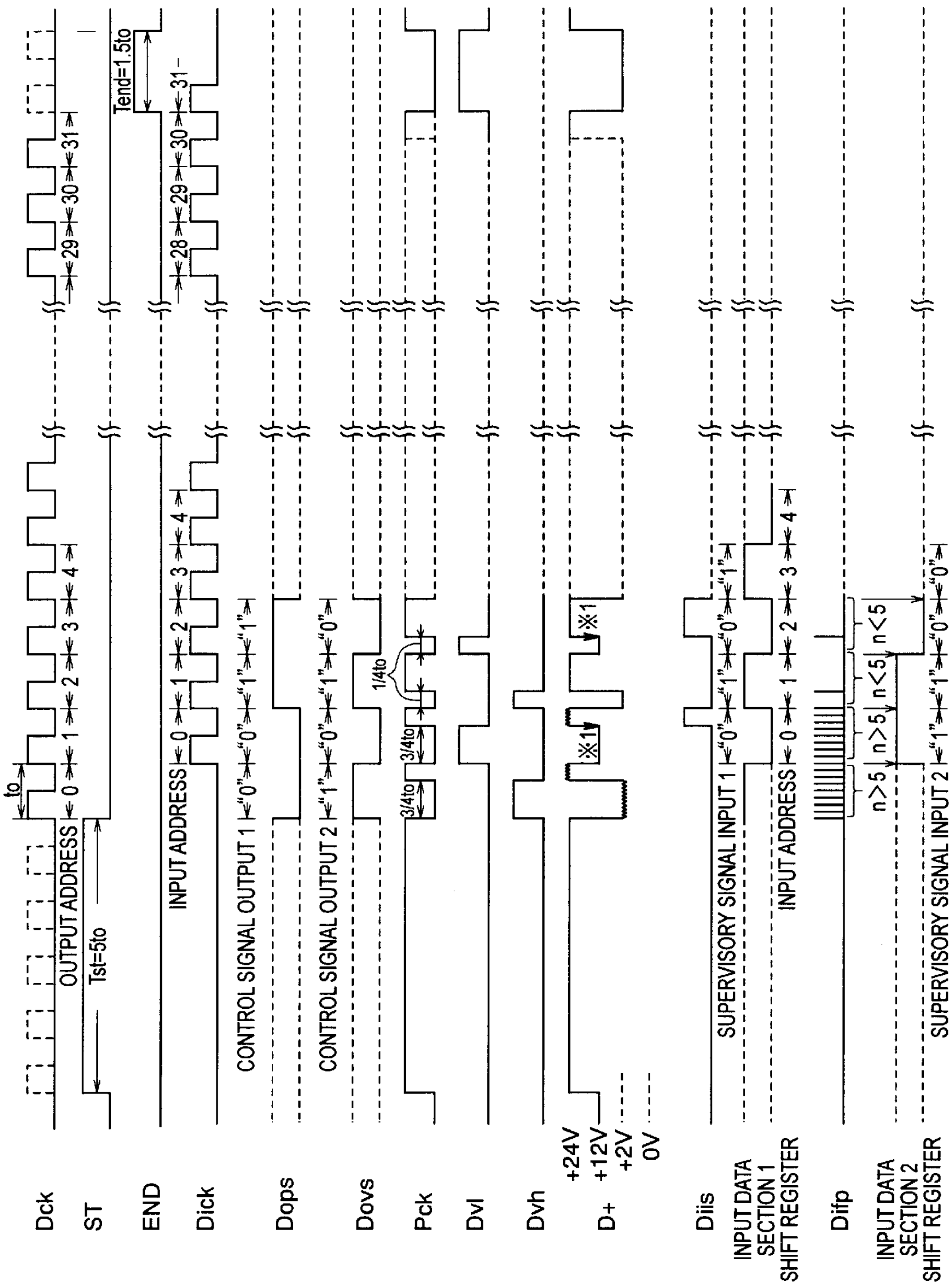
Figure 21:
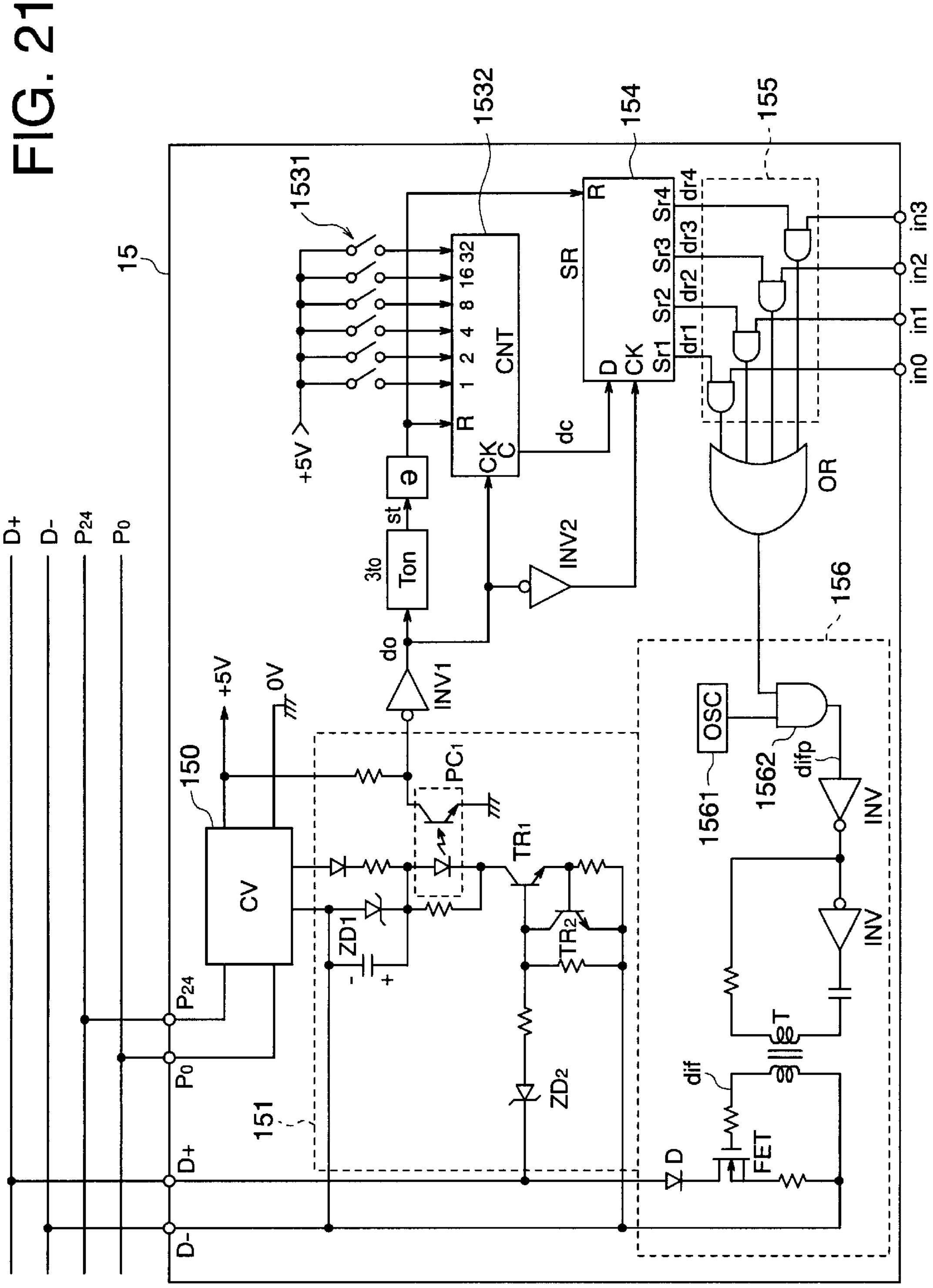
Figure 22:
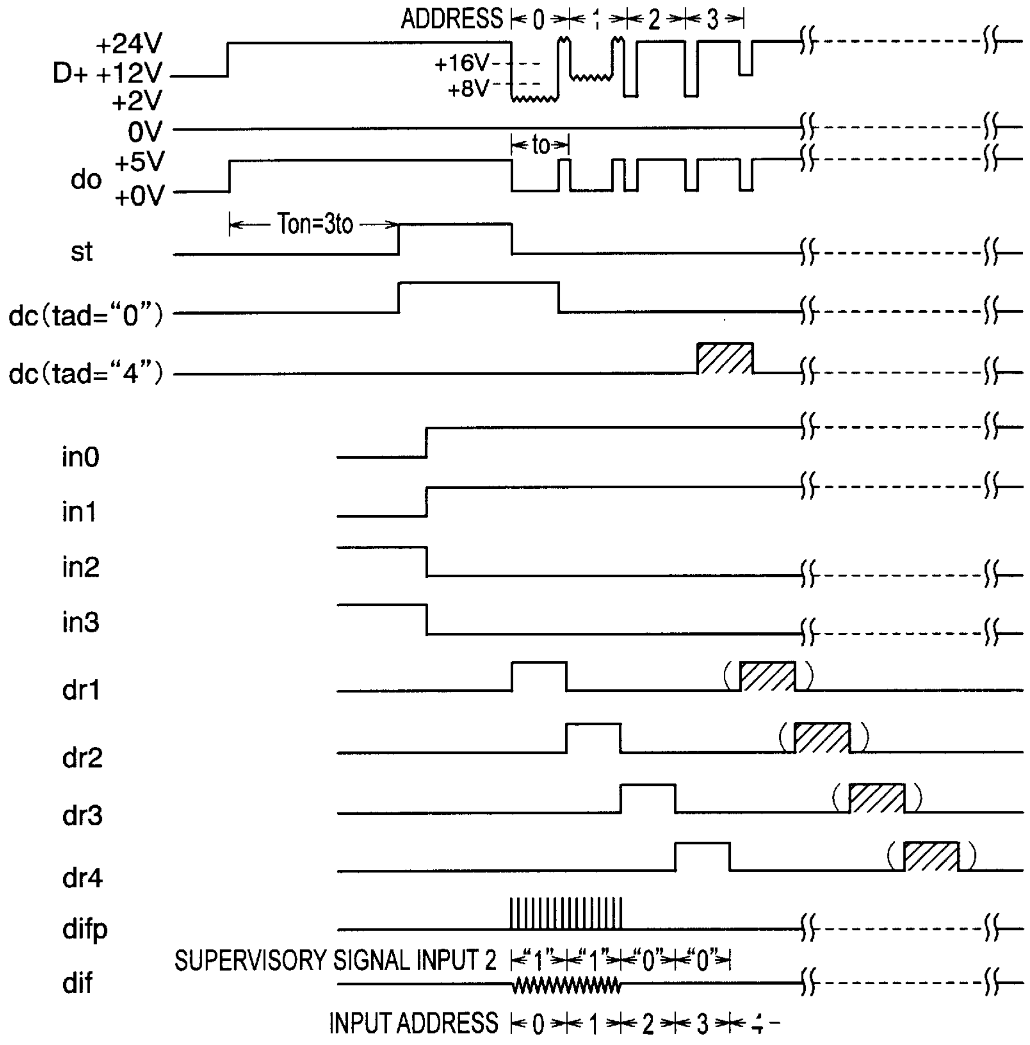

The configuration of the third embodiment is basically the same as that of the first or second embodiment, except that a part of the configuration of the parent station 13 and that there is another child station input section 15 in addition to the child input section 15 in the configuration shown in FIG. 10. FIG. 19 shows a configuration of another example of the parent station 13 and FIG. 20 shows the waveforms of signals in the parent station 13 shown in FIG. 19. FIG. 21 shows a configuration of another example of the child station input section 15 and FIG. 22 shows the waveforms of signals in the child station input section 15 of FIG. 21. The child station input section 15 in the configuration shown in FIG. 10 forms and superimposes the current-modulated versions of the first supervisory data signals #1 (IN0i through IN31i). The child station input section 15 in the configuration in FIG. 21 forms and superimposes the frequency-modulated versions of the second supervisory data signals #2 (IN0f through IN31f). The child station input section 15 shown in FIG. 10 and the child station input section 15 shown in FIG. 21 are at the same address in addresses (child station addresses) assigned to the child station 11. The child station input section 15 shown in FIG. 10 and the child station input section 15 shown in FIG. 21 at the same address may exist in the same child station 11 or in different child stations 11.

Referring to FIGS. 19 and 20, the parent station 13 in FIG. 19 is basically the same as the parent station 13 in FIG. 14, except that a slight difference exists because second supervisory signals IN0f through IN31f are extracted in addition to first supervisory signals IN0i through IN31i. The extraction of the first supervisory signals IN0i through IN31i is substantially the same as that in the first or second embodiment.

The supervisory signal superimposed on a control signal on a first data signal line, D+, is output from a line transformer, T. The signal from line transformer T is input into an amplifier, AMP, in frequency signal detection means 1311, where it is amplified, then is input into a comparator, CMP, where it is waveform-shaped (its wave height is evened up), then it is output as output Difp. The data of the supervisory signal that corresponds to the data of the control signal is at the same address position in output Difp as that of the data of the control signal. Output Difp is input into the counter, CNT, of receive data extraction means 1310 through a two-input OR gate circuit.

Counter CNT counts pulses in output Difp input into it every period of clock CK and outputs the result as signal Difs. To accomplish this, signal Dick is input into the reset input of counter CNT through a differential circuit, δ, and a count output, Difs, of counter CNT is input through a two-input OR gate circuit. Counter CNT is reset by signal Dick every clock of signal Dick and outputs a count result. A threshold value, N, held by holding means (a register, not shown ) is used to this counting, where N=5, for example. That is, because the frequency of the supervisory signal is eight times higher than that of the control signal, eight pulses would be counted in one period of clock CK. Therefore a number slightly larger than one half of the number of the pulses is chosen as threshold value N. This enables the supervisory signal which is susceptible to noise compared with the control signal due to its high frequency to be detected correctly. For example, because the data of supervisory signal at address "0" of the control signal is "1", the count value would be eight and therefore "1 (or a high)" is output as signal Difs. Because the data at address 3 of the control signal is "0", the count value would be four or less and therefore "0 (or a low)" is output as signal Difs. Because the data of the supervisory signal is counted, signal Difs, which is the result of the count, is output one address after the control signal. For example, signal Difs for the supervisory signal superimposed on address 0 of the control signal is output with the timing of address 1 of the control signal. In other words, this corresponds to address 0 of the supervisory signal. Because the period of end signal END is 1.5to, a count result can be output also for the last address (address 31).

The second input data section 138 is constituted of a 32-bit register and takes signal Difs in predetermined bits in a predetermined order to hold it until a new data value is input and then outputs it. Therefore, supervisory signals IN0f through IN31f, which are 32-bit parallel data at address 0 through address 31, are eventually converted into serial signals and input into an input unit 101 from the input data section 138. Thus, the supervisory signal is input like "1100 . . . ", for example.

As described earlier, the current-modulated first supervisory data signal #1 is superimposed by the child station input section 15 having an appropriate address in the configuration shown in FIG. 10. This is the same as that in the configuration of the first or second embodiment and the explanation of which will be omitted. Frequency-modulated second supervisory signal #2 is superimposed by the child station input section 15 having an appropriate address in the configuration in FIG. 21.

Referring to FIGS. 21 and 22, the configuration of the child station input section 15 in FIG. 21 is basically similar to that the child station input section 15 in FIG. 10 that detects fist supervisory signals IN0i through IN31i. In practice, the configuration is somewhat different from that of the one shown in FIG. 10 because it detects second supervisory signals IN0f through IN31f. The child station input section 15 is not and does not need to be aware whether supervisory signals in0 through in3 to be superimposed are the first or second supervisory signal.

The child station input section 15 in FIG. 21 obtains as output from an OR circuit serial supervisory signals in0 through in 3 in synchronization with extracted clock CK by the configuration similar to that of the child station input section in FIG. 10. The output from the OR circuit is input into one of the inputs of the two-input AND gate circuit 1562. An oscillation output from an oscillator (OSC) 1561 is input into the other input of the AND gate circuit 1562. The frequency of the oscillation output may be 8f0, for example, where f0 is the frequency of clock CK. The frequency of the oscillation output is not limited to a value eight times larger than that of clock CK. It may be a higher value, for example 16 times as large as that of the clock CK may be used. The AND gate circuit 1562 and the oscillator 1561 constitute frequency signal superimposition means 156. Supervisory signals in0 through in3 may take a value, "1100", shown in FIG. 22 during a period in which outputs dr1 through dr4 are high. Thus, the AND gate circuit 1562 opens while supervisory signals in0 and in1 are output, and oscillation 8f0 is output from the oscillator 1561 as output difp. On the other hand, the AND gate circuit 1562 closes while supervisory signals in2 and in3 are output, and oscillation 8f0 is not output from the oscillator 1561.

Output difp is output to line transformer T through line drivers 1571 and 1572, then applied to the gate electrode of a power MOSFET as signal dif. The FET is repeatedly turned on and off according to signal dif, allowing a signal proportional to signal dif to be output onto the first data signal line, D+. That is, the supervisory signal is superimposed on the control signal as shown in FIG. 22. The amplitude of the supervisory signal superimposed is limited by the resistance value of a diode, FET, and a resistance connected in series. If the control signal is at a pseudo ground level, 0+, (2V), the amplitude of the supervisory signal would be within the difference (2 V in this case) between a true ground level (0 V) and pseudo ground level, 0+. Because the supervisory signal is superimposed on the control signal, it should not affect the control signal and should be able to be differentiated from the control signal.

Figure 23:
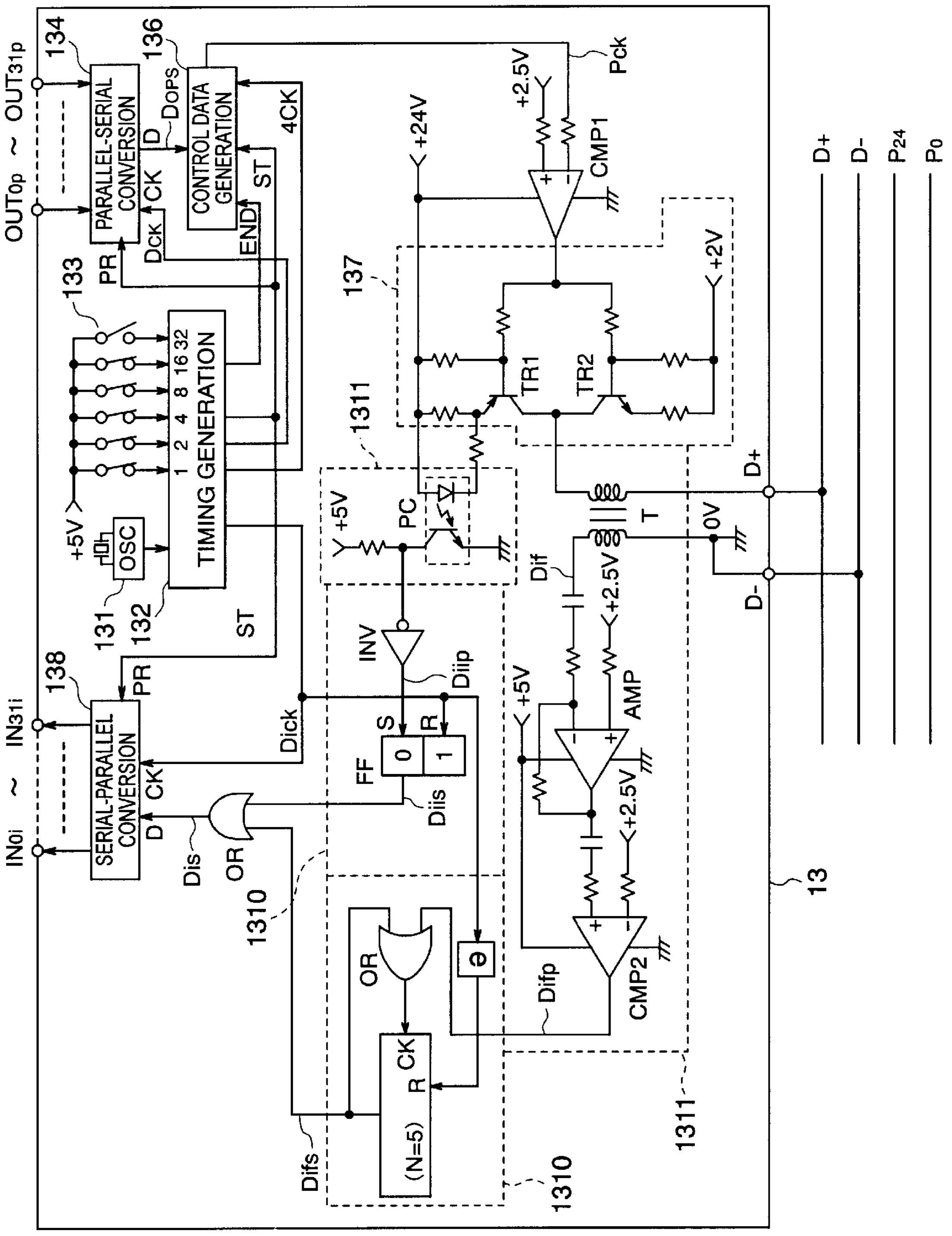
FIG. 23 is a schematic diagram of yet another example of a parent station.

The parent station 13 shown in FIG. 19 may be configured as shown in FIG. 23. That is, output Diis from a flip flop, FF, and output Difs from a counter may be input into an OR gate circuit to obtain the logical OR, Dis, between them and signal Dis may be input into the input data section 138. This is a configuration in which only the first supervisory data signal is superimposed from one child station address and the second supervisory data signal from it is not and only the second supervisory data signal is superimposed from the other child station address and the first supervisory data signal is not (the child station addresses do not overlap one another, that is, a serial mapping configuration). In this configuration, the number of input data sections 138 can be reduced to one and supervisory signals can be received by the single input data section 138. This is advantageous for the expansion of a system because, if there are a current-modulation-based child station and a frequency-modulation-based child station in the system, the parent station can treat them as if they were homogeneous stations. In this example, the number of output data sections 134 and the number of control data signal generation means 136 are also reduced to one. That is, the parent station output section 135 is the same as the parent station output section 135 in the first embodiment (see FIG. 6).

While the present invention has been described with respect to the particular embodiments, various variations thereof may be implemented within the spirit thereof.

Figure 24:
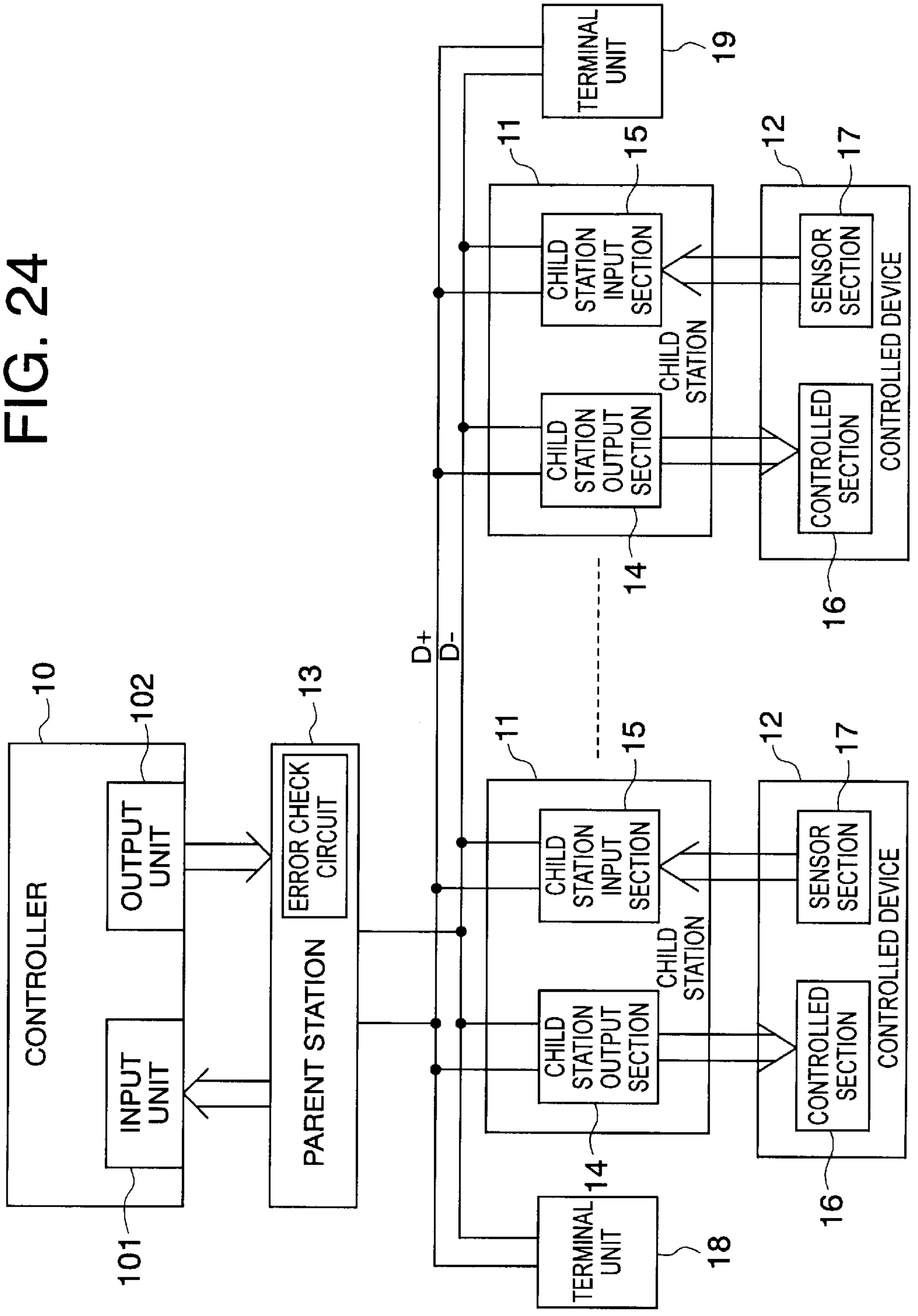
FIG. 24 is a block diagram of another basic configuration of the present invention.

For example, terminal units 18 and/or 19 may preferably be provided at the end of one or both of first data signal line D+ and second data signal line D−, as shown in FIG. 24. The configuration of the terminal units 18 and 19 may be as described in Japanese Patent Application No. 1-140826, for example.

An error check circuit may be provided in the parent station 13 as shown in FIG. 24. The error checking circuit monitors first data signal line D+ to check the status (such as a short circuit) of the line. The configuration of the error checking circuit may be as described in Japanese Patent Application No. 1-140826.

Power lines P ($P_{24}$ and $P_0$) to supply external power to the child station 11 and controlled device 12 may be eliminated if the power requirements of the child station 11 can be met by 24 V output from the parent station 13 and superimposed on first data signal line D+ as shown in FIG. 24.

Further, as understood from the first to third embodiment, one or two signal(s) selected from the first and second control signals and one or two signal(s) selected from the first and second supervisory signals can be use together appropriately. That is, the configuration shown in the first to third embodiment can be achieved by using various signal combination obtained by these selection.

Also, although not shown, as described in Japanese Patent Application No. 1-140826, a plurality of parent station output sections 135 and input sections 139, which are not shown, may be provided in the parent station 13 so as to correspond to particular child stations. In this case, m parent station output sections 135 and m child station output sections 14 are provided (where $m \geqq 1$), associated with one another in one-to-one relationship, and connected to a data signal line in a predetermined sequence. On the other hand, n parent station input sections 139 and n child station input sections 15 are provided (where $n \geqq 1$), associated with one another, and connected to the data signal line in a predetermined sequence. Each of the associated sections is actuated sequentially under the control of a timing signal to transmit control data to an associated controlled section 16 and transmit a supervisory signal from a sensor section 17. In addition, a plurality of groups of stations having such a configuration may be provided. The number of stations in the groups may vary.

Also, although not shown, the operations by the parent station 13 and child stations 11 may be implemented by the execution of programs for performing the above-described processes by a CPU (central processing unit) provided in each of the stations.

According to the present invention, in a control and supervisory signal transmission system a control signal is provided as a binary signal having a predetermined duty ratio and a supervisory signal is detected as the presence or absence of a current signal generated by contention between the supervisory signal and a power-supply voltage on the rising edge of the power-supply voltage so that the control signal and the supervisory signal can be superimposed on a clock signal. Thus, the fast bidirectional transmission of the signals can be achieved, the control signal and the supervisory signal can be output onto a common data signal line, and these signals can be bidirectionally transmitted at the same time, allowing the signal transmission rate to be twice as fast as a conventional rate.

According to the present invention, in a control and supervisory signal transmission system a first control signal is provided as a binary signal having a predetermined duty ratio, a second signal is provided as a signal having a predetermined voltage level other than that of the power-supply voltage of the first signal or a pseudo ground level, a supervisory signal is detected as the presence or absence of a current signal generated by contention between the supervisory signal and the power-supply voltage on the rising edge of the power-supply voltage so that the first and second control signals and the supervisory signal can be superimposed on a clock signal. Thus, the fast bidirectional transmission of the signals can be achieved, a multiplexed (duplexed) control signal and the (not-multiplexed) supervisory signal can be output onto a common data signal line and these signals can be bidirectionally transmitted at the same time. That is, the need for separately providing a period during which the control signal is transmitted and a period during which the supervisory signal is transmitted on the common data signal line, allowing the signal transmission rate to be three times faster than a conventional rate.

According to the present invention, in a control and supervisory signal transmission system a first control signal is provided as a binary signal having a predetermined duty ratio, a second control signal is provided as a signal having a predetermined voltage level other than that of the power-supply voltage of the first signal or a pseudo ground level, a supervisory signal, a first supervisory signal is detected as the presence or absence of a current signal generated by contention between the supervisory signal and the power-supply voltage on the rising edge of the power-supply voltage, and a second supervisory signal is provided as a signal having a frequency (and amplitude) different from other signals so that the fist and second control signals and the first and second supervisory signal can be superimposed on a clock signal. Thus, the fast bidirectional transmission of the signals can be achieved, the multiplexed (duplexed) control signal and the multiplexed (duplexed) supervisory signal can be output onto a common data signal line, these signals can be bidirectionally transmitted at the same time, and the control signal and supervisory signal can be fully duplexed, thereby eliminating the need for separately providing a period during which the control signal is transmitted and a period during which the supervisory signal is transmitted on the common data signal line and allowing the signal transmission rate to be four times faster than a conventional rate.

What is claimed is:

1. A control signal and supervisory signal transmission system comprising:

a controller;

a plurality of controlled devices, each including a controlled section and a sensor section to monitor said controlled section;

a parent station connected to said controller and a data signal line common to said plurality of controlled devices; and a plurality of child stations associated with said plurality of controlled devices and connected to said data signal line and said associated controlled devices, wherein a control signal from said controller is transmitted to said controlled section and a supervisory signal form said sensor section is transmitted to said controller through said data signal line, wherein said parent station further comprises:

timing generation means to generate a predetermined timing signal in synchronization with a clock having predetermined periodicity;

a parent station output section to change the duty ratio between a period of a level other than a predetermined power-supply voltage level and the subsequent period of said power-supply voltage level according to each data value of a control data signal input from said controller in every period of said clock under the control of said timing signal to convert said control data signal into a serial pulse voltage signal and output it onto said data signal line; and a parent station input section to detect a supervisory data signal superimposed on said serial pulse voltage signal transmitted over said data signal line as the presence or absence of a current signal generated by contention between said supervisory data signal and said power-supply voltage in every period of said clock under said timing signal to extract each data value of said serial supervisory data signal, convert said data value into said supervisory signal, and input said supervisory signal into said controller, and wherein each of said plurality of child stations further comprises:

a child station output section to determine the duty ratio between a period of a level other than the power-supply voltage level of said serial pulse voltage signal and the subsequent period of said power-supply voltage in every period of said clock under said timing signal to extract each value of said control data signal and to provide data corresponding to said child station in said data value to said corresponding controlled section; and a child station input section to form a supervisory data signal formed from a binary of different current levels and superimposes said supervisory data signal on a predetermined position of said serial pulse voltage signal as the data value of said supervisory signal.

2. A control signal and supervisory signal transmission system according to claim 1, wherein said level other than said power-supply voltage level comprises a pseudo ground level.

3. A control signal and supervisory signal transmission system according to claim 1, further comprising:

a power line to supply power to said plurality of child stations;

wherein said child station output section has a current limiter circuit connected to said data signal line, the status of said current limiter circuit varying according to said serial pulse voltage signal; an output circuit comprising a photocoupler to detect and output said serial pulse voltage signal according to the status of said current limiter circuit; and power-supply voltage generation means to provide a power-supply voltage formed by smoothing and to stabilize a power-supply voltage provided by said power line to said output circuit by isolating said power-supply voltage from said power line by using a power transformer.

4. A control signal and supervisory signal transmission system according to claim 1;

wherein said parent station outputs a start signal onto said data signal line before outputting said serial pulse voltage signal, said start signal having a voltage level equal to said power-supply voltage and a period longer than one period of said clock.

5. A control signal and supervisory signal transmission system according to claim 1;

wherein said child station output section counts clocks extracted from said serial pulse voltage signal to extract an address pre-assigned to said child station output section and provides data at said address to said controlled section.

6. A control signal and supervisory signal transmission system according to claim 1;

wherein said child station input section counts clocks extracted from said serial pulse voltage signal to extract an address pre-assigned to said child station input section and superimposes a supervisory signal for said controlled section on said serial pulse voltage signal at said address.

7. A control signal and supervisory signal transmission system according to claim 1;

wherein said parent station counts clocks extracted from said serial pulse voltage signal to extract an address pre-assigned to said parent station and outputs an end signal.

8. A control signal and supervisory signal transmission system comprising:

a controller;

a plurality of controlled devices, each including a controlled section and a sensor section to monitor said controlled section;

a parent station connected to said controller and a data signal line common to said plurality of controlled devices; and a plurality of child stations associated with said plurality of controlled devices and connected to said data signal line and said associated controlled devices, wherein a control signal from said controller is transmitted to said controlled section and a supervisory signal form said sensor section is transmitted to said controller through said data signal line, wherein said parent station further comprises:

timing generation means to generate a predetermined timing signal in synchronization with a clock having predetermined periodicity;

a parent station output section to change the duty ratio between a period of a level other than a predetermined power-supply voltage level and the subsequent period of said power-supply voltage level according to each data value of a first control data signal input from said controller and to drive the level during the period of the level other than said power-supply voltage level to a predetermined level different from said power-supply voltage or to a ground level in every period of said clock under the control of said timing signal to convert said first and second control data signals into serial pulse voltage signals and output said serial pulse voltage signals onto said data signal line; and a parent station input section to detect a supervisory data signal superimposed on said serial pulse voltage signal transmitted over said data signal line as the presence or absence of a current signal generated by contention between said supervisory data signal and said power-supply voltage in every period of said clock under said timing signal to extract each data value of said serial supervisory data signal, convert said data value into said supervisory signal, and input said supervisory signal into said controller, and wherein each of said plurality of child stations further comprises:

a child station output section to determine the duty ratio between a period of a level other than the power-supply voltage level of said serial pulse voltage signal and the subsequent period of said power-supply voltage in every period of said clock under said timing signal to extract each value of said first control data signal or to determine whether the level during the period of the level other than said power-supply voltage level is the predetermined voltage level or the pseudo ground level to extract each data value of said second control data signal, and to provide data corresponding to said child station in said data value to said corresponding controlled section; and a child station input section to form a supervisory data signal formed from a binary of different current levels and superimposes said supervisory data signal on a predetermined position of said serial pulse voltage signal as the data value of said supervisory signal.

9. A control signal and supervisory signal transmission system comprising:

a controller;

a plurality of controlled devices, each including a controlled section and a sensor section to monitor said controlled section;

a parent station connected to said controller and a data signal line common to said plurality of controlled devices; and plurality of child stations associated with said plurality of controlled devices and connected to said data signal line and said associated controlled devices, wherein a control signal from said controller is transmitted to said controlled section and a supervisory signal form said sensor section is transmitted to said controller through said data signal line, wherein said parent station further comprises:

timing generation means to generate a predetermined timing signal in synchronization with a clock having predetermined periodicity;

a parent station output section to change the duty ratio between a period of a level other than a predetermined power-supply voltage level and the subsequent period of said power-supply voltage level according to each data value of a first control data signal input from said controller and to drive the level during the period of the level other than said power-supply voltage level to a predetermined level different from said power-supply voltage or to a ground level in every period of said clock under the control of said timing signal to convert said first and second control data signals into serial pulse voltage signals and output said serial pulse voltage signals onto said data signal line; and a parent station input section to detect a first supervisory data signal superimposed on said serial pulse voltage signal transmitted over said data signal line as the presence or absence of a current signal generated by contention between said supervisory data signal and said power-supply voltage and to detect a second supervisory data signal formed from a frequency signal superimposed on said serial pulse voltage signal transmitted over said data signal line in every period of said clock under said timing signal to extract each data value of said first and second serial supervisory data signals, convert said data value into said supervisory signal, and input said supervisory signal into said controller, and wherein each of said plurality of child stations further comprises:

a child station output section to determine the duty ratio between a period of a level other than the power-supply voltage level of said serial pulse voltage signal and the subsequent period of said power-supply voltage in every period of said clock under said timing signal to extract each value of said first control data signal or to determine whether the level during the period of the level other than said power-supply voltage level is the predetermined voltage level or the pseudo ground level to extract each data value of said second control data signal, and to provide data corresponding to said child station in said data value to said corresponding controlled section; and a child station input section to form a first supervisory data signal formed from a binary of different current levels or a second supervisory data signal formed from a frequency signal and superimposes said first or second supervisory data signal on a predetermined position of said first or second serial pulse voltage signal as the data value of said supervisory signal.

10. A control signal and supervisory signal transmission system according to claim 9, wherein said frequency signal has a frequency higher than that of said clock and an amplitude substantially less than or equal to a value twice as high as a difference between said pseudo ground level and a true ground level.

11. A control signal and supervisory signal transmission system comprising:

a controller;

a plurality of controlled devices, each including a controlled section and a sensor section to monitor said controlled section;

a parent station connected to said controller and a data signal line common to said plurality of controlled devices; and a plurality of child stations associated with said plurality of controlled devices and connected to said data signal line and said associated controlled devices, wherein a control signal from said controller is transmitted to said controlled section and a supervisory signal form said sensor section is transmitted to said controller through said data signal line, wherein said parent station further comprises:

timing generation means to generate a predetermined timing signal in synchronization with a clock having predetermined periodicity;

a parent station output section to convert a control data signal into a serial pulse voltage signal by driving the first or latter half of the control data signal to a predetermine power-supply voltage level and to drive the latter or first half of the control data signal to a predetermined voltage level different from said power-supply voltage level or a pseudo ground level depending on each data value of the control data signal level input from said controller in every period of said clock under the control of said timing signal, and to output said serial pulse voltage signal onto said data signal line; and a parent station input section to detect a frequency signal superimposed on said serial pulse voltage signal transmitted over said data signal line in every period of said clock under the control of said timing signal to extract each data value of said serial supervisory signal and to convert said data value into said supervisory signal to input said supervisory signal into said controller, and wherein each of said plurality of child stations further comprises:

a child station output section to determine whether or not the first or latter half of said serial pulse voltage signal is the predetermined voltage level different from said power-supply voltage level or the pseudo ground level in every period of said clock under the control of said timing signal to extract each data value of said control data signal and to provide data corresponding to said child station in said data value to said controlled section; and a child station input section to form a frequency signal according to a value in said corresponding sensor section under the timing of said timing signal and to superimpose said frequency signal on a predetermined position of said serial pulse voltage signal as the data value of said supervisory signal.

12. A control signal and supervisory signal transmission system according to claim 11;

wherein said frequency signal is superimposed on said serial pulse voltage signal at the position of data corresponding to said child station.

13. A control signal and supervisory signal transmission system according to claim 11;

wherein said frequency signal has a frequency higher than that of said clock and an amplitude substantially less than or equal to a value twice as high as a difference between said pseudo ground level and a true ground level.

14. A control signal and supervisory signal transmission system according to claim 11;

wherein said parent station output section and said parent station input section connected to said-data signal line are separated from each other by a signal separator; and wherein said child station output section and said child station input section connected to said data signal line are separated from each other by a signal separator.

15. A control signal and supervisory signal transmission system according to claim 11;

wherein said parent station outputs a start signal onto said data signal line before outputting said serial pulse voltage signal, said start signal having a voltage level equal to said power-supply voltage and a period longer than one period of said clock.

16. A control signal and supervisory transmission system according to claim 11;

wherein said child station output section counts clocks extracted from said serial pulse voltage signal to extract an address pre-assigned to said child station output section and provides data at said address to said controlled section.

17. A control signal and supervisory signal transmission system according to claim 11;

wherein said parent station counts clocks extracted from said serial pulse voltage signal to extract an address pre-assigned to said parent station and outputs an end signal.

18. A control signal and supervisory signal transmission system comprising:

a controller;

a plurality of controlled devices, each including a controlled section and a sensor section to monitor said controlled section;

a parent station connected to said controller and a data signal line common to said plurality of controlled devices; and a plurality of child stations associated with said plurality of controlled devices and connected to said data signal line and said associated controlled devices, wherein a control signal from said controller is transmitted to said controlled section and a supervisory signal form said sensor section is transmitted to said controller through said data signal line, wherein said parent station further comprises:

timing generation means to generate a predetermined timing signal in synchronization with a clock having predetermined periodicity;

a parent station output section to change the duty ratio between the period of a predetermined power-supply voltage level and a period of a pseudo ground level according to each value of a control data signal input from said controller in every period of said clock under the control of said timing signal to convert said control data signal into a serial pulse voltage signal and output said serial pulse voltage signal onto said data signal line; and a parent station input section to detect a frequency signal superimposed on said serial pulse voltage signal transmitted over said data signal line in every period of said clock under the control of said timing signal to extract each data value of said serial supervisory signal and to convert said data value into said supervisory signal to input said supervisory signal into said controller, and wherein each of said plurality of child stations further comprises:

a child station output section to determine the duty ratio between a period of the power-supply voltage level of said serial pulse voltage signal and a period of the pseudo ground level in every period of said clock under the control of said timing signal to extract each data value of said control data signal and to output data corresponding to said child station in said data value to said corresponding controlled section; and a child station input section to form a frequency signal according to a value in said corresponding sensor section under the timing of said timing signal and to superimpose said frequency signal on a predetermined position of said serial pulse voltage signal as the data value of said supervisory signal.

19. A control signal and supervisory signal transmission system comprising:

a controller;

a plurality of controlled devices, each including a controlled section and a sensor section to monitor said controlled section;

a parent station connected to said controller and a data signal line common to said plurality of controlled devices; and a plurality of child stations associated with said plurality of controlled devices and connected to said data signal line and said associated controlled devices, wherein a control signal from said controller is transmitted to said controlled section and a supervisory signal form said sensor section is transmitted to said controller through said data signal line, wherein said parent station further comprises:

timing generation means to generate a predetermined timing signal in synchronization with a clock having predetermined periodicity; and a parent station output section to change the duty ratio between the period of a predetermined power-supply voltage level and a period of a pseudo or ground level according to each value of a control data signal input from said controller in every period of said clock under the control of said timing signal to convert said control data signal into a serial pulse voltage signal and output said serial pulse voltage signal onto said data signal line, wherein said parent station outputs a start signal onto said data signal line before outputting said serial pulse voltage signal, said start signal having a voltage level equal to said power-supply voltage and a period longer than one period of said clock, and said parent station counts clocks extracted from said serial pulse voltage signal to extract an address pre-assigned to said parent station and outputs an end signal, and wherein each of said child stations further comprises:

a child station output section to determine the duty ratio between a period of the power-supply voltage level of said serial pulse voltage signal and a period of the pseudo or true ground level in every period of said clock under the control of said timing signal to extract each data value of said control data signal and to output data corresponding to said child station in said data value to said corresponding controlled section, and said child station output section outputs clocks extracted from said serial pulse voltage signal to extract an address pre-assigned to said child station output section and provides data at said address to said corresponding controlled section.

* * * * *